United States Patent
Ohno

(10) Patent No.: US 9,019,536 B2
(45) Date of Patent: Apr. 28, 2015

(54) PRINT SYSTEM, IMAGE FORMING DEVICE, INTERMEDIATE PROCESSING DEVICE, WEB SERVICE PROVISION DEVICE, METHOD OF CONTROLLING PRINT SYSTEM, AND STORAGE MEDIUM

(71) Applicant: Canon Kabushiki Kaisha, Tokyo (JP)

(72) Inventor: Hajime Ohno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 13/731,153

(22) Filed: Dec. 31, 2012

(65) Prior Publication Data

US 2013/0188221 A1    Jul. 25, 2013

(30) Foreign Application Priority Data

Jan. 19, 2012 (JP) ................................ 2012-009393

(51) Int. Cl.
*G06F 3/12* (2006.01)
*G06K 15/22* (2006.01)
*G06F 21/60* (2013.01)

(52) U.S. Cl.
CPC ............ *G06F 3/1296* (2013.01); *G06F 3/1222* (2013.01); *G06F 3/1239* (2013.01); *G06F 3/1288* (2013.01); *G06F 21/608* (2013.01)

(58) Field of Classification Search
CPC ... G06F 3/1296; G06F 21/608; G06F 3/1222; G06F 3/1239; G06F 3/1288
See application file for complete search history.

(56) References Cited

U.S. PATENT DOCUMENTS

| 7,345,779 | B2 | 3/2008 | Tamai et al. | |
| 8,316,423 | B2 * | 11/2012 | Nishimi | 726/5 |
| 2008/0239372 | A1 * | 10/2008 | Okamoto et al. | 358/1.15 |
| 2009/0310787 | A1 | 12/2009 | Nishimi | |
| 2011/0176162 | A1 * | 7/2011 | Kamath et al. | 358/1.15 |
| 2012/0140285 | A1 * | 6/2012 | Kamath et al. | 358/1.15 |

FOREIGN PATENT DOCUMENTS

| JP | 2003-196054 A | 7/2003 |
| WO | 2011/090474 A1 | 7/2011 |

OTHER PUBLICATIONS

Chinese Office Action issued in corresponding application No. 201310020537.X on Feb. 16, 2015.

* cited by examiner

*Primary Examiner* — Benny Q Tieu
*Assistant Examiner* — Sunil Chacko
(74) *Attorney, Agent, or Firm* — Carter, DeLuca, Farrell & Schmidt, LLP

(57) ABSTRACT

An image forming device provided in a print system displays a shared use request screen operated by a user other than a manager of the image forming device, and for a request shared use of the image forming device. The external print service provided in the print system receives the shared use request of the image forming device by the user through the shared use request screen, and generates a setting screen for setting by the manager of whether or not to approve the received shared use request of the image forming device.

9 Claims, 34 Drawing Sheets

```
<Register>
    <name>
        <Item>Printer1</Item>     — 910
    </name>
    <RPID>
        <Item>RP-E2B53416</Item>  — 920
    </RPID>
</Register>
```

FIG. 11A

```
<Printers>
    <SPID>
        <Item>58467595</Item>
    </SPID>
    <name>
        <Item>Printer1</Item>
    </name>
    <RPID>
        <Item>RP-E2B53416</Item>
    </RPID>
</Printers>
```
— 1110

| 1121 | 1122 | 1123 | 1124 | 1125 |
|---|---|---|---|---|
| RPID | SPID | Printer name | Printer manager ID of external print service | Internal company printer manager ID |
| RP-E2B53416 | 58467595 | Printer1 | PrnAdm1@xxx.com | 23456 |

FIG. 11C

| 1121 | 1122 | 1123 | 1124 | 1125 | 1126 |
|---|---|---|---|---|---|
| RPID | SPID | Printer name | Printer manager ID of external print service | Internal company printer manager ID | VPID |
| RP-E2B53416 | 58467595 | Printer1 | PrnAdm1@xxx.com | 23456 | VP-98765 |

| 1601 | 1602 | 1603 |
|---|---|---|
| SPID | Shared use user ID | Status |
| 58467595 | User1@xxx.com | Request received |
| 58467595 | User2@xxx.com | Request received |
| 58467595 | User3@xxx.com | Printing possible |
| 01587302 | User1@xxx.com | Printing possible |

FIG. 16B

| 1601 | 1602 | 1603 | 1604 |
|---|---|---|---|
| SPID | Shared use user ID | Status | Internal company printer access right |
| 58467595 | User1@xxx.com | Request received | Permitted |
| 58467595 | User2@xxx.com | Request received | Not permitted |
| 58467595 | User3@xxx.com | Printing possible | Permitted |
| 01587302 | User1@xxx.com | Printing possible | Not permitted |

FIG. 16C

| 1601 | 1602 | 1603 | 1605 |
|---|---|---|---|
| SPID | Shared use user ID | Status | Internal company user ID |
| 58467595 | User1@xxx.com | Request received | 107429 |
| 58467595 | User2@xxx.com | Request received | 056789 |
| 58467595 | User3@xxx.com | Printing possible | 034567 |
| 01587302 | User1@xxx.com | Printing possible | 107429 |

FIG. 16D

| 1601 | 1602 | 1603 | 1606 |
|---|---|---|---|
| SPID | Shared use user ID | Status | Deletion request |
| 58467595 | User1@xxx.com | Request received | Yes |
| 58467595 | User2@xxx.com | Request received | – |
| 58467595 | User3@xxx.com | Printing possible | – |
| 01587302 | User1@xxx.com | Printing possible | – |

FIG. 16E

| 1601 | 1602 | 1603 | 1607 |
|---|---|---|---|
| SPID | Shared use user ID | Status | Shared use commencement time |
| 58467595 | User1@xxx.com | Request received | - |
| 58467595 | User2@xxx.com | Request received | - |
| 58467595 | User3@xxx.com | Printing possible | 2011/12/26  8:35:00 |
| 01587302 | User1@xxx.com | Printing possible | 2011/12/24  13:15:00 |

FIG. 16F

| 1601 | 1602 | 1603 | 1607 | 1608 |
|---|---|---|---|---|
| SPID | Shared use user ID | Status | Shared use commencement time | Shared use automatic deletion time |
| 58467595 | User1@xxx.com | Request received | - | - |
| 58467595 | User2@xxx.com | Request received | - | - |
| 58467595 | User3@xxx.com | Printing possible | 2011/12/26  8:35 | 72 hours |
| 01587302 | User1@xxx.com | Printing possible | 2011/12/24  13:15 | - |

FIG. 16G

| 1601 | 1602 | 1603 | 1609 |
|---|---|---|---|
| SPID | Shared use user ID | Status | Final use time |
| 58467595 | User1@xxx.com | Request received | - |
| 58467595 | User2@xxx.com | Request received | - |
| 58467595 | User3@xxx.com | Printing possible | 2011/12/26  8:35 |
| 01587302 | User1@xxx.com | Printing possible | 2011/12/24  13:15 |

FIG. 17

```
To: Printer1 Manager <PrnAdm1@xxx.com >
Subject : Order for permitted use from external print service
Message:
Manager printer1,
Print permission request for using printer 1 through external print
service has received from general user 107429.
Access external print service management screen (https://print.xxx.com/
manage) for approval process.

End of message
```

FIG. 19A

Printer shared use management  ID: PrnAdm1@xxx.com  — 1900

Shared use user of printer 1

| User ID | Shared use |
|---|---|
| User1@xxx.com | ☐ |
| User2@xxx.com | ☐ |
| User3@xxx.com | ☑ |

1920 — User ID column; 1930 — Shared use column; 1940 — OK; 1950 — Cancel

FIG. 19B

Printer shared use management  ID: PrnAdm1@xxx.com

Shared use user of printer 1

| User ID | Shared use | |
|---|---|---|
| User1@xxx.com | Approve | Deny |
| User2@xxx.com | Approve | Deny |
| User3@xxx.com |  | Release |

1961 — Approve; 1962 — Deny; 1960 — row group; 1963 — Release

FIG. 19C

Printer shared use management  ID: PrnAdm1@xxx.com

Shared use user of printer 1

| User ID | Internal company user ID | Shared use |
|---|---|---|
| User1@xxx.com | 107429 | ☐ |
| User2@xxx.com | 056789 | ☐ |
| User3@xxx.com | 034567 | ☑ |

OK   Cancel   — 1970

FIG. 20A

| Printer shared use management | | ID: PrnAdm1@xxx.com |

Shared use user of printer 1    1980

| User ID | Internal company printer access right | Shared use |
|---|---|---|
| User1@xxx.com | ◯ Printing permitted in company on this printer | ☐ |
| User2@xxx.com | ✕ Printing not permitted in company on this printer | ☐ |
| User3@xxx.com | — | ☑ |

[OK] [Cancel]

FIG. 20B

| Printer shared use management | | ID: PrnAdm1@xxx.com |

Shared use user of printer 1    1990

| User ID | Deletion request | Shared use |
|---|---|---|
| User1@xxx.com | Yes | ☑ |
| User2@xxx.com |  | ☑ |
| User3@xxx.com |  | ☑ |

[OK] [Cancel]

FIG. 21A

| Printer shared use management | | ID: PrnAdm1@xxx.com |
|---|---|---|

Shared use user of printer 1

| User ID | Internal company User ID | Shared use |
|---|---|---|
| User1@xxx.com | 107429 | ☐ |
| User2@xxx.com | 056789 | ☐ |
| User3@xxx.com | 034567 | ☑ |

Time until automatic release from shared use setting 72 hours — 1991

[OK] [Cancel]

FIG. 21B

| Printer shared use management | | ID: PrnAdm1@xxx.com |
|---|---|---|

Shared use user of printer 1

| User ID | Shared use automatic release time | Shared use |
|---|---|---|
| User1@xxx.com | 72 hours | ☑ |
| User2@xxx.com | — | ☑ |
| User3@xxx.com | — | ☑ |

[OK] [Cancel]  1992

```
To: < User1@xxx.com >
Subject : Notification from external print service
Message:
User1@xxx.com
Your external print service use request for printer 1 has been approved.
Printing enabled from web application.

End of message
```

FIG. 24
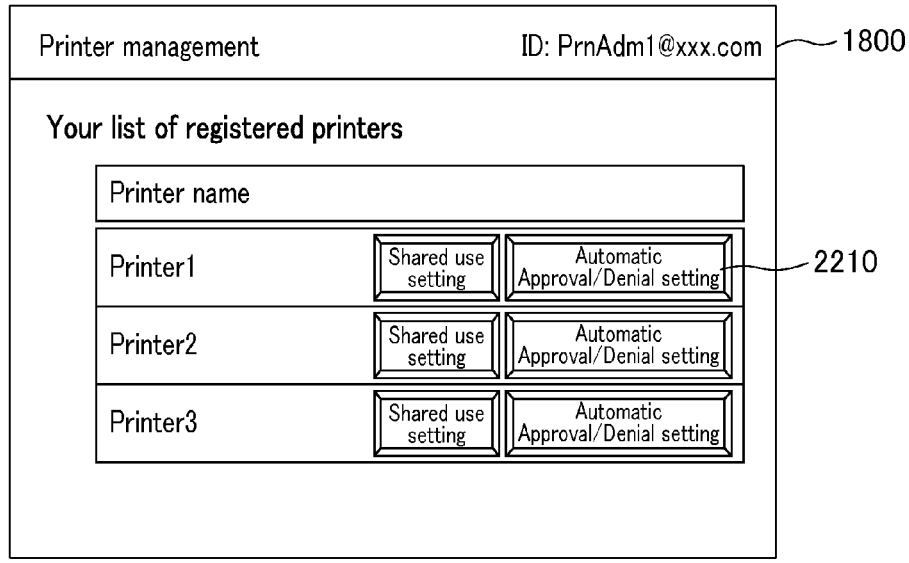
FIG. 25
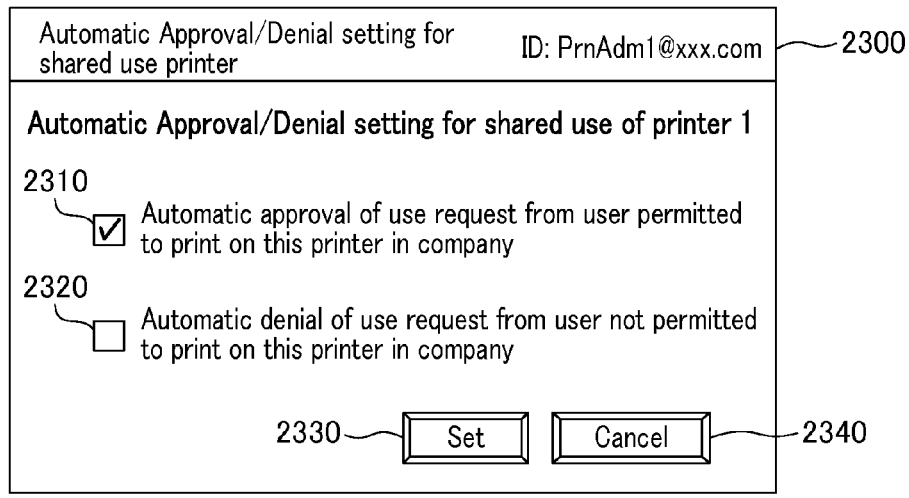
FIG. 26
| 2401 | 2402 | 2403 | 2400 |
|---|---|---|---|
| SPID | Automatic approval | Automatic denial | |
| 58467595 | Valid | Invalid | |
| 01587302 | Valid | Valid | |
| 51247412 | Invalid | Valid | |
| 19127025 | Invalid | Invalid | |

FIG. 35

| 3301 | 3302 |
|---|---|
| User ID of printer manager | Shared use automatic release time |
| PrnAdm1@xxx.com | 72 hours |
| PrnAdm2@xxx.com | – |
| PrnAdm3@xxx.com | 144 hours |

```
<ShareApplication>
    <RPID>
        <Item>RP-E2B53416</Item>     3610
    </RPID>
</ShareApplication>
```

FIG. 38B

```
<ShareApplication>
    <RPID>
        <Item>RP-E2B53416</Item>
    </RPID>
    <LocalPermission>
        <Print>True</Print>
        <Scan>True</Scan>
        <Copy>True</Copy>
        <Fax>False</Fax>
        <Send>False</Send>          3620
    </LocalPermission>
</ShareApplication>
```

FIG. 39

| VPID | RPID | User ID for printer job conversion service | Shared use user ID | Status |
|---|---|---|---|---|
| VP-98765 | RP-E2B53416 | USERAAA | User1@xxx.com | Request received |
| VP43210 | RP-136A43E0 | USERBBB | User2@xxx.com | Printing possible |

| User ID of external print service | SPID | Printer name | VPID |
|---|---|---|---|
| PrnAdm1@xxx.com | 58467595 | Printer1 | VP-98765 |
| PrnAdm1@xxx.com | 01587302 | Printer2 | VP-43210 |
| . | . | . | . |
| . | . | . | . |

3000

PRINT SYSTEM, IMAGE FORMING DEVICE, INTERMEDIATE PROCESSING DEVICE, WEB SERVICE PROVISION DEVICE, METHOD OF CONTROLLING PRINT SYSTEM, AND STORAGE MEDIUM

BACKGROUND OF THE INVENTION

1. Field of the Invention

The present invention relates to a print system, an image forming device, an intermediate processing device, a web service provision device, a method of controlling the print system, and a storage medium.

2. Description of the Related Art

A print system has been proposed in which a print instruction is transmitted from a client to a server and the server receives the print instruction and converts the content to be printed into print data. Japanese Patent Laid-Open No. 2003-196054 discloses a method in which a server receives a print instruction and information for controlling printing from a client, and the server produces print data based on the information configured to control printing. The server disclosed in Japanese Patent Laid-Open No. 2003-196054 provides a client with a service for producing print data.

As disclosed above, a configuration is known in which a web server provides a client with a service. In recent years, cloud computing has also attracted attention as a configuration for providing a service from a web server to a client. A main feature of cloud computing is that data conversion and data processing are executed in a distributed manner using many computing resources so as to process requests from many clients in a simultaneous manner. At present, vendors provide various types of services in a disorderly manner by implementing web services in a cloud computing environment to realize cloud computing.

Vendors that provide services in a cloud computing environment include notable vendors such as Google (registered trademark). Google (registered trademark) has not only established many large-scale data centers but also cooperates with devices and is developing a data communication structure between devices and services. For example, Google (registered trademark) has developed a data communication structure configured to provide services in cooperation with image forming devices and has disclosed an interface for providing data communication between the cloud computing environment provided by Google (registered trademark) and image forming devices. The image forming devices in this system receive a print request from the service to thereby execute printing. The provision of the interface in relation to an image forming device enables the image forming device to be specified for printout from a client. This print system has been termed Google Cloud Print ("GCP").

The flow of operations until use of GCP will be described below making reference to FIG. 34. A single user uses GCP from a single image forming device by acquiring a Google account, and associates the Google account and the image forming device ID for registration in GCP (steps 1 and 2 in FIG. 34). In this manner, a print job queue is produced that is identified by the Google account and the image forming device ID on GCP. The user logs into an application corresponding to GCP by use of the Google account, and selects a print menu of the application to, so that a list of print job queues associated with the Google account is displayed. When the user selects any of the print job queues, the print job is sent to the selected job queue to enable printing.

An image forming device is associated with considerable capital investment, and normally it is unusual for a single person to perform constant and continuous printing on a dedicated image forming device. Therefore, cost advantages are available in relation to shared use of a single image forming device by shifting the time of printing on the image forming device among a plurality of persons. GCP provides predetermined solutions that are adapted for this type of use.

Use of a single image forming device by a plurality of users through GCP is enabled by use of the "shared" function provided by GCP. Firstly, a single user registers the image forming device with GCP using the method described above. The user is termed a print manager or simply a manager. The print manager determines whether use of the image forming device by another user is appropriate. When the print manager is advised of the Google account of a user who is deemed to be appropriate as a user of the image forming device, the printer manager can enable shared settings of the account in the print job queue corresponding to the image forming device (steps 3 and 4 in FIG. 34). In this manner, the print job queue corresponding to the image forming device registered by the print manager is associated with the Google account of a user that is recognized by the manager for use of the image forming device, and thereby the user can send a print job to the print job queue. Consequently, when a user who is a manager implements shared settings by use of a shared function, a user who is not a manager can perform a print operation on the image forming device without registration of information for the image forming device by the user who is not a manager.

In this manner, GCP provides a method of shared use of a single image forming device among a plurality of users. This method is designed and formulated on the assumption of shared use of an image forming device by a small number of persons who have a preexisting relationship of trust. A more precise concept is shared use of a household image forming device by a family. In the following description, since the print services developed by companies other than Google are also configured in generally the same manner as GCP on the basis of user authentication, access rights and shared management, such services are generally denoted as an external print service.

The quality and quantity of Web applications are continuing to increase, and have reached a level of application to professional duties. Furthermore, an external print service is increasingly applied as an open-sourced method for printing content on a Web application. This method enables printing on an image forming device that has received a print instructions through an external print service from a PC or a mobile device without installation of a print driver for example. Consequently, increasingly, companies want to print by use of an external print service using a Web application.

As described above, an external print service is appropriately applied to shared use of an image forming device by a small number of persons in a preexisting relationship of trust. This is due to the fact that the structure of a shared function for an image forming device provided by external print service in their current configuration depend solely on an account of the external print service, and that any person who has an account for the external print service can register as a shared user of the image print device. Consequently, when the external print service is applied without modification within a company, security threats means that application is not appropriate in the following configurations. For example, application without modification of an external print service is not appropriate in the context of a large-scale company when there is limited acquaintance between employees or when business centers are dispersed. Furthermore, application within a company of an external print service without modification is not appropriate in an operating environment such as a workplace that makes high use of out-sourced personnel and thus has rapid staff turnover, or a workplace associated with frequent entry of external trading partners. This is because in those circumstances, for example, social engineering allows unauthorized use of the image forming device which is relatively simple by fraudulent adoption of an identity and causes a print manager to register that account. Conversely, unauthorized acquisition and printing of important information is possible by fraudulent adoption of an identity as a print manager, acquisition of an account for a general user of an external print service and shared registration as a general user on an image forming device that is different from the originally intended image forming device.

In the above circumstances, a solution is possible by use of a personnel operation feature. Examples include designation of print managers, strict implementation of identity verification, management of a user register for shared registration on an image forming device, or the like. However, these solution strategies are associated with a high probability of a mistake occurring in manual operations due to the troublesome operations required of both print managers and general users, and therefore time is required until a general user can use an image forming device. Furthermore, in a company that is associated with a number of operators of at least a certain number, a single image forming device is generally subject to shared use by about ten to more than twenty users, and a single manager will manage several to several hundred image forming devices. Consequently, an increase in management responsibilities must be minimized when enabling use of an external print service.

SUMMARY OF THE INVENTION

The print system according to the present invention enables shared use by a plurality of general users of an image forming device that is managed by a print manager through external print service, and provides a structure for reducing security threats.

According to an aspect of the present invention, a print system includes a web service provision device that generates a print job upon receipt of a print instruction from a user device, and an image forming device that executes printing upon receipt of the print job from the web service provision device through a network. The image forming device includes a display unit configured to display a screen operated by a user other than a manager of the image forming device and for a shared use request of the image forming device. The web service provision device includes a receiving unit configured to receive the shared use request of the image forming device by the user through the shared use request screen, and a generating unit configured to generate a setting screen for setting by the manager of whether or not to approve the shared use request of the image forming device.

The print system according to the present invention enables shared use by a plurality of general users of an image forming device managed by a printer manager through external print service, and provides a structure for reducing security threats.

Further features of the present invention will become apparent from the following description of exemplary embodiments with reference to the attached drawings.

BRIEF DESCRIPTION OF THE DRAWINGS

FIG. 11A illustrates a response to a printer registration request.

FIG. 11B and FIG. 11C illustrate a printer information table.

FIG. 16A to FIG. 16G illustrate printer shared use information tables.

FIG. 17 illustrates a use request approval order notification to a printer manager.

FIG. 19A to FIG. 19C illustrate a printer shared use management user interface.

FIG. 20A and FIG. 20B illustrate another printer shared use management user interface.

FIG. 21A and FIG. 21B illustrate another printer shared use management user interface.

FIG. 24 illustrates a printer management menu user interface including an automatic approval/denial setting button.

FIG. 25 illustrates an automatic approval/denial setting user interface for printer shared use.

FIG. 26 illustrates an automatic approval/denial setting table.

FIG. 35 illustrates a table storing a shared use automatic release time setting.

FIG. 38A and FIG. 38B illustrate an example of printer shared use request information from a general user.

FIG. 39 illustrates an example of a printer shared use information table for a print job conversion and redistribution service.

FIG. 40 illustrates an example of a printer information table provided in an external print service.

DESCRIPTION OF THE EMBODIMENTS

First Embodiment

Figure 1:
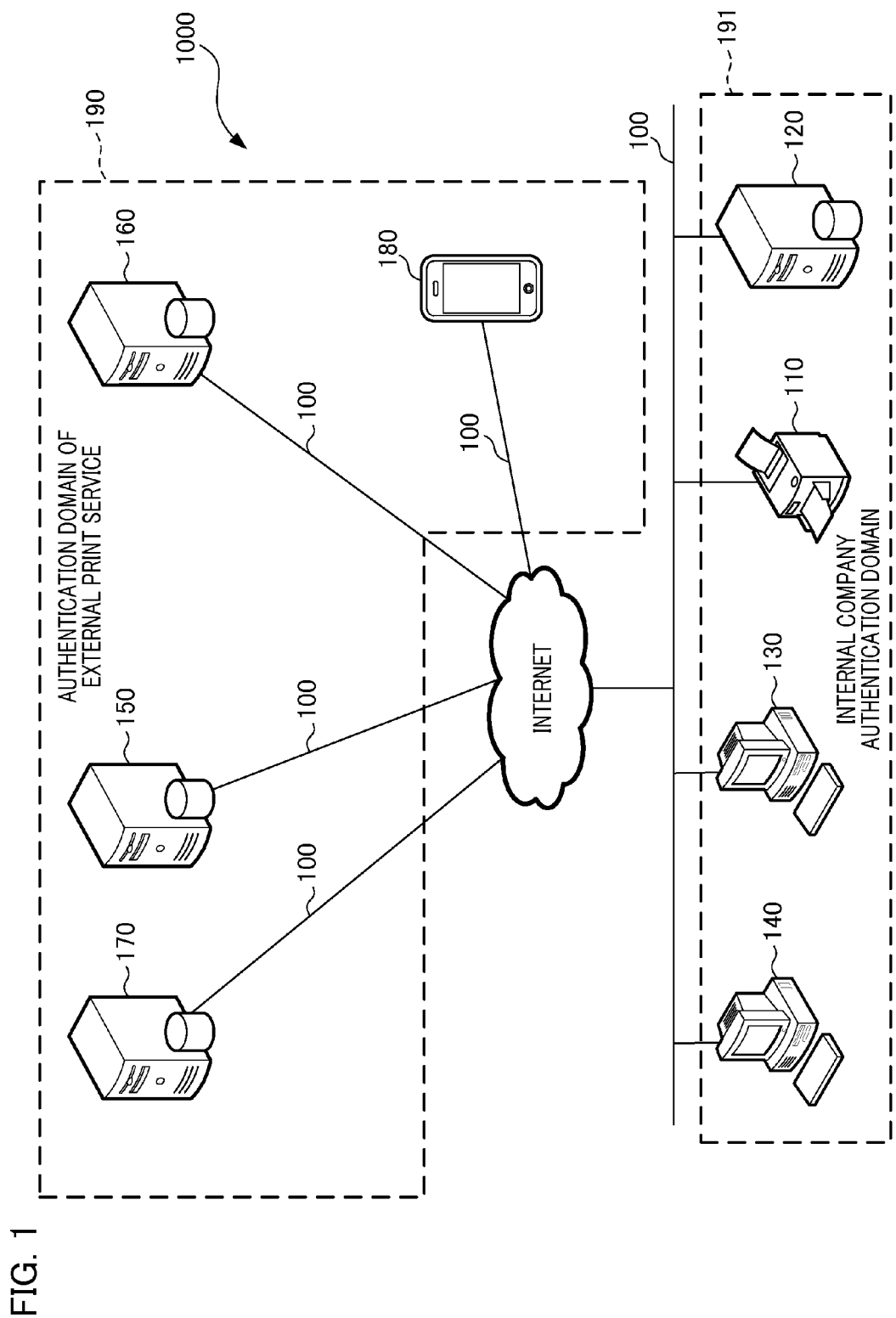
FIG. 1 is a diagram illustrating an example of a print system configuration according to a first embodiment.

FIG. 1 is a diagram illustrating an example of a configuration of a print system 1000 according to a first embodiment. The print system 1000 includes a printer manager terminal 140, a general user terminal 130, an image forming device 110 and an authentication server A120. These devices are provided in a corporate environment and are interconnected by a network 100. The network 100 is connected to the Internet 101. The print system 1000 includes a Web application server 160, an external print server 150 and an authentication server B170. The three servers function as a web service provision device, and may be servers provided by the same vendor. In this configuration, the servers may be connected through the network 100. In the present embodiment, although the description will use an example in which a general user terminal is connected to through the network, the present invention may be applied from a general user mobile terminal 180 through the Internet 101 as illustrated in the figure. The general user mobile terminal 180 is not limited to provision within an authentication domain 190, and may be provided in another authentication domain.

The respective servers and devices that configure the print system 1000 can be connected through the Internet 101, and may transmit data to each other. In the figure, each device and each server may be a single unit or a plurality of units. The authentication domain 190 of the external print service illustrates the scope that is required to receive authentication by the authentication server B170 when accessing a device within the domain 190. In the same manner, an internal company authentication domain 191 illustrates the scope required to receive authentication by the authentication server A120.

Figure 2:
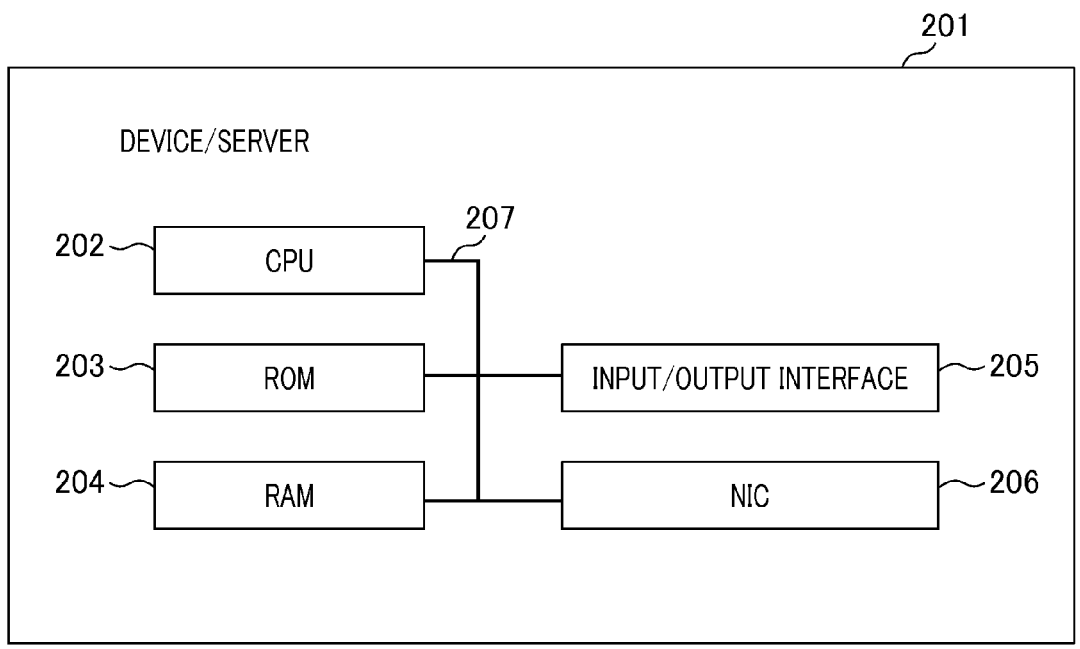
FIG. 2 is a diagram illustrating an example of the hardware configuration of each group of servers and each device configuring the print system.

FIG. 2 is a diagram illustrating an example of the hardware configuration of each group of services and each device configuring the print system 1000. Reference numeral 201 denotes the respective servers and the respective devices that configure the print system 1000. A CPU (central processing unit) 202 is a unit that executes various programs and realizes various functions. A ROM (read only memory) 203 is a unit that stores various programs. A RAM (random access memory) 204 is a storage unit that functions as a temporal working storage region for the CPU 202. The CPU 202 loads a program stored in the ROM 203 into the RAM 204 to thereby execute the program. An input/output interface 205 transmits data to a display (not shown) connected to each device and each server group.

The input/output interface 205 receives data from a pointing device (not shown). An NIC (network interface card) 206 connects each device and each server group that configures the print system 1000 to the network 100. The processing units described above can perform reception/transmission of data via a bus 207. Furthermore, the image forming device 101 includes a print unit (not shown). The print unit can receive/transmit data from/to units via the bus 207. The print unit is a unit that can print a raster image on a storage medium. The image forming device 110 may include an image processing unit other than a print unit, for example, a scanner unit and a FAX unit.

Figure 3:
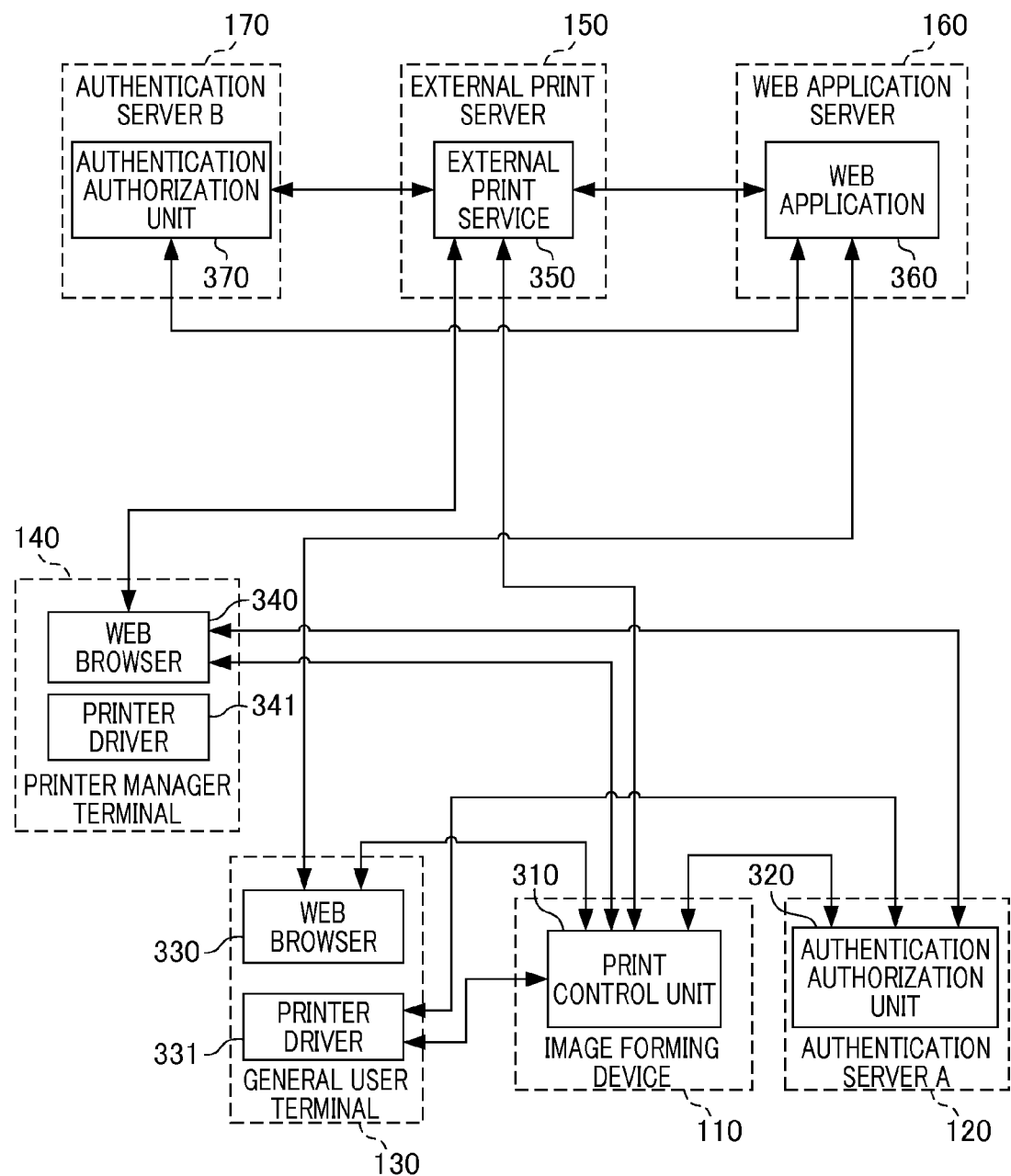
FIG. 3 is a diagram illustrating an example of the software configuration of each group of servers and each device configuring the print system.

Next, the hardware configuration of each device and each server group that configures the print system 1000 will be described. FIG. 3 illustrates an example of the software configuration of each device and groups of servers configuring the print system 1000. A print control unit 310 controls the operation of the image forming device 110, and the authentication authorization unit 320 executes authentication of an internal company user. The Web browser 330 operates on the general user terminal 130 (for example, a PC), and includes a printer driver 331 on the general user terminal 130. A printer manager Web browser 340 operates on the printer manager terminal 140 and includes a printer driver 341 on the printer manager terminal 140 (for example, a PC). The external print service 350 operates on the external print server 150, the Web application 360 operates on the Web application server 160, and the authentication authorization unit 370 operates on the external authentication server B170. The programs that realize the functions of each software element in FIG. 3 are stored in the ROM 203 of each device and server group. These functions are realized by the CPU 202 loading and executing programs into the RAM 204.

Figure 4:
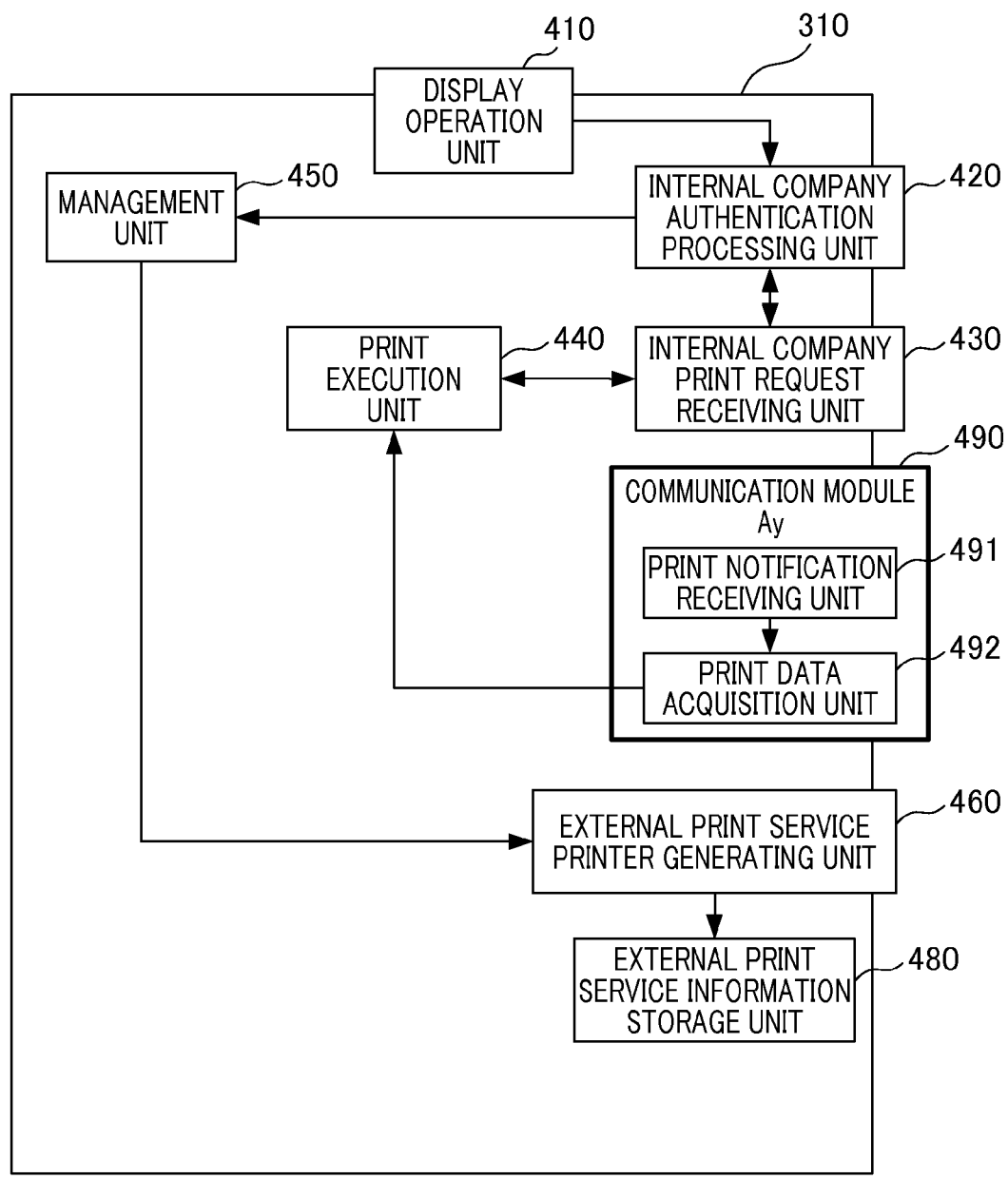
FIG. 4 is a functional block diagram of a print control unit.

The function of the print control unit 310 of the image forming device 110 will be described below making reference to FIG. 4. The print control unit 310 includes a display and operation unit 410, an internal company authentication processing unit 420, an internal company print request receiving unit 430, a print execution unit 440, and a management unit 450. The print control unit 310 includes an external print service printer generating unit 460, an external print service information storage unit 480, and a communication module Ay 490. The communication module Ay 490 includes a print notification receiving unit 491 configured to receive and transmit a print notification from an external print service, and a print data acquisition unit 492 configured to acquire print data after receiving the notification.

The internal company authentication processing unit 420 authenticates an internal company user ID. The internal company print request receiving unit 430 receives a print request from an internal company PC or the like. The print execution unit 440 executes actual printing, and the management unit 450 performs the operation control for each unit. The external print service printer generating unit 460 registers the image forming device 110 in the external print service 350, and the external print service information storage unit 480 stores information for the registered image forming device. The communication module Ay 490 is adapted to the interface published by the external print service.

Next, the function of the external print service 350 that functions as a web service provision device configured to provide web services will be described making reference to FIG. 10. The print service 350 includes a printer registration unit 1001, a printer information storage unit 1002, a user authentication unit 1003, a control unit 1004, a printer shared use request unit 1021, and a printer shared use management unit 1022. The print service 350 includes a Web application cooperation unit 1030, in addition to a communication module Ax1010 that includes a print notification sending unit 1011 and a print data storing unit 1012.

The printer registration unit 1001 receives a registration request for the image forming device from a printer manager. The printer information storage unit 1002 associates information for the image forming device and the printer manager and stores them. The user authentication unit 1003 performs user authentication. The control unit 1004 acquires a print job from the Web application 360 through the Web application cooperation unit 1030 and stores it in a print data storage unit 1012. The printer shared use request unit 1021 and the printer shared use management unit 1022 perform processing related to shared use of a printer by a general user and a printer manager. The details thereof are described below. The communication module Ax1010 is an interface published by the external print service, and for example, can communicate by establishing a communication session A with the communication module Ay490. The print data storage unit 1012 stores a print job upon receipt of instructions from the control unit 1004. The print notification sending unit 1011 sends notification information indicating completion of preparation of print data to the image forming device 110 when the storage of the print job is completed.

Figure 36:
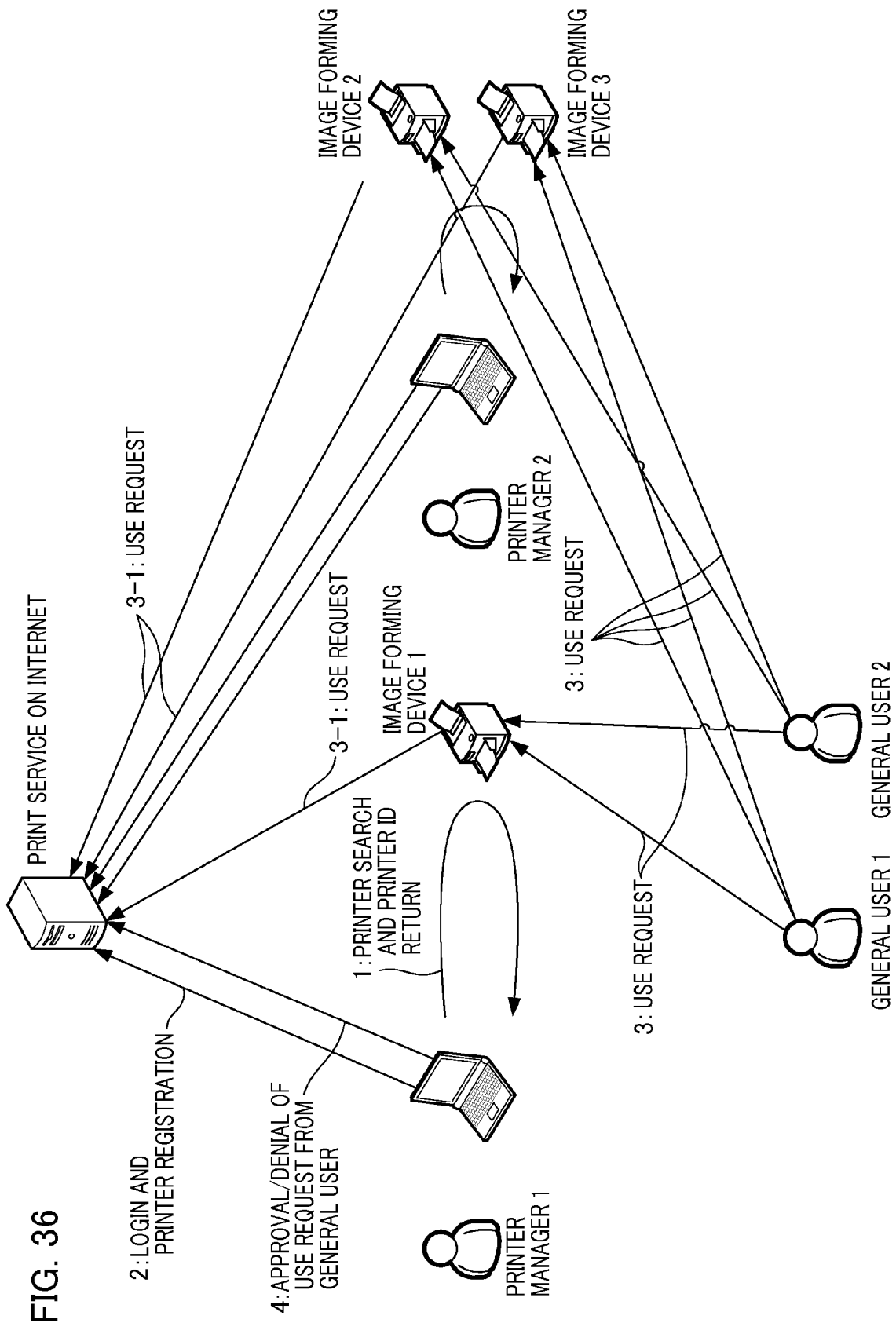
FIG. 36 illustrates a shared use setting for an external print service according to the present invention.

FIG. 36 describes an example of operational processing of the print system 1000 according to the present embodiment. The printer manager acquires an account of the external print service 350, and associates that account and the printer ID for registration in the external print service 350 (steps 1 and 2 in FIG. 36). A general user performs a shared use request to the external print service 350 (steps 3 and 3-1 in FIG. 36). A printer manager logged into an account on the external print service 350 approves or denies the shared use request for the printer on the screen provided from the external print service 350 (step 4 in FIG. 36). Although a configuration is illustrated in which the printer manager 1 performs registration by use of a PC when registering the image forming device 1, a configuration is also possible in which the image forming device 1 is operated to thereby perform direct printer registration in the image forming device by the printer manager 1. This configuration will also be described when describing the registration process for the printer.

The details of the functions of each device and server provided in the print system of the present embodiment and the operational sequence for those functions will be described below. The functions described herein are divided into the following five categories.
1. Functions related to internal company authentication;
2. Functions configured for registration by a printer manager of an internal company image forming device in the external print service;
3. Functions configured for request by a general user for use of an internal company image forming device through external print service;
4. Functions configured for authentication by a printer manager of a printer use request through an external print service by a general user;
5. Functions configured for printing using an internal company image forming device through external print service from a Web application by a general user or a printer manager.

Firstly, internal company authentication will be described. As described above, there are difficulties for a manager to ascertain identity fraud by a user. Therefore, a configuration is desirable in which only user that passes internal company authentication can request use of the image forming device 110 from the external print service 350. In this context, internal company authentication will be described based on the premise of use of a printer by a general user.

After some type of authentication, generally an internal company user can use internal company IT resources. It is possible to categorize the image forming device 110 based on a location of the authentication function and the input location of the user authentication information. The location of the authentication function may be (1) the image forming device 110 itself, (2) a company internal intranet integrated authentication server, or (3) the PC of the general user. The authentication server A120 illustrated in FIG. 1 is used when performing authentication in accordance with (2). On the other hand, the input location of the user authentication information includes (A) the operation panel of the image forming device 110, (B) the Web browser 330 on the PC of the general user, or (C) the software on the PC of the general user (applications or drivers). An internal company authentication system is established by a combination thereof.

Similar aspects related to functions of this type of authentication system are described below. A first similar aspect may be configured by concentrating the authentication function by authentication from a plurality of image forming devices 110 rather than authentication from a single image forming device 110. A second similar aspect includes provision functions for the authentication of an internal company user to deal with the increasing examples in which a system such as an application service provider (ASP) is provided outside the company to handle internal company operations. A third similar aspect includes provision of the input location for user authentication information in the form of a Web browser or software on the general user mobile terminal 180 to deal with increasing use of mobile terminals. A fourth similar aspect includes reinforcing security by the addition of authorization (a use right to a specific resource) in addition to user authentication (confirmation of the identity of a given person). Therefore, it is possible to allow a user to perform a printer use request through an external print service 350.

Figure 5A:
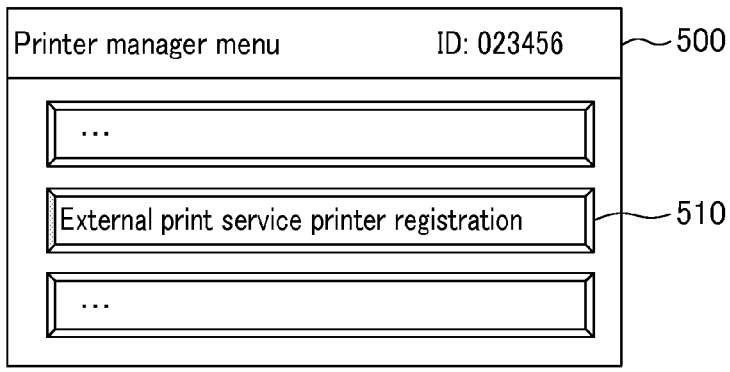
FIGS. 5A and 5B illustrate a menu user interface for a printer manager.
Figure 6:
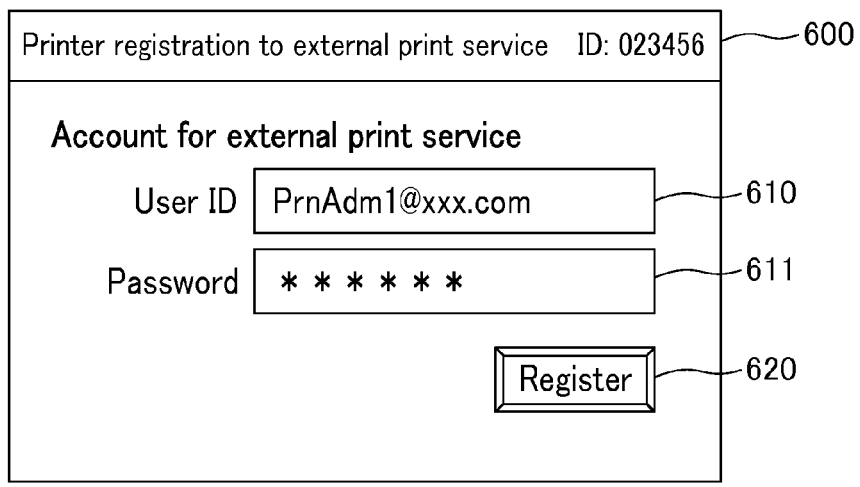
FIG. 6 illustrates a printer registration user interface for an external print service.
Figure 27:
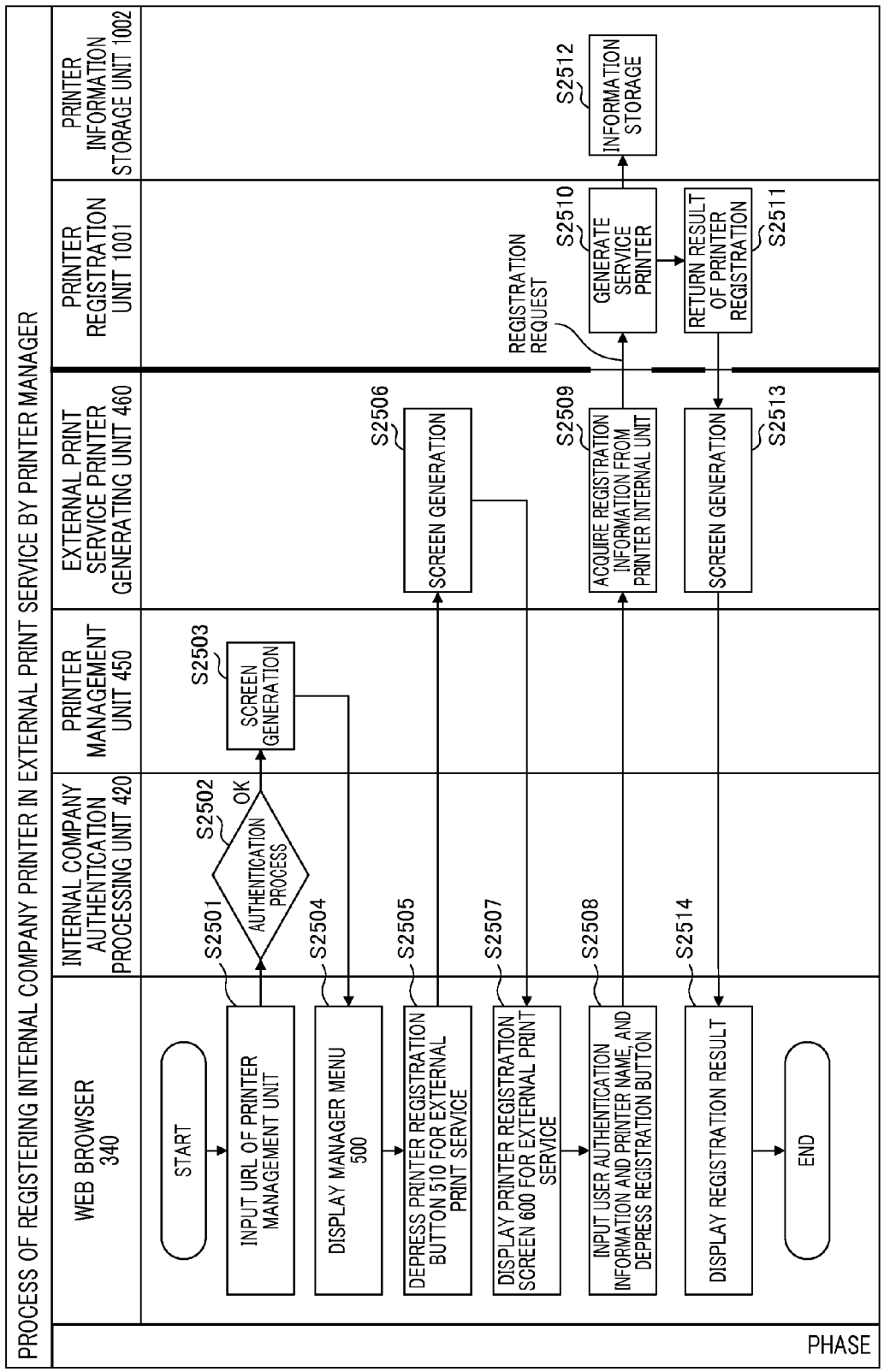
FIG. 27 illustrates a sequence of processing for registering an image forming device in an external print service.

Next, with reference to the sequence illustrated in FIG. 27, the function of registering two internal company image forming devices 110 by a printer manager on an external print service 350 will be described. Firstly, in a step S2501, the printer manager performs authentication on the internal company authentication processing unit 420 from a Web browser 340 on the printer manager terminal 140. Then when the authentication is successful in step S2502, the Web browser 340 enables access to the management unit 450 in the print control unit 310 (S2503). In step S2504, the management unit 450 accessed from the Web browser 340 generates the manager menu 500 illustrated in FIG. 5A for display on the Web browser 340. The manager menu 500 includes a printer registration button 510 to the external print service 350. When the printer manager presses the button 510 in step S2505, the external print service printer generating unit 460 in step S2506 generates a printer registration screen 600 to the external print service illustrated in FIG. 6 for display on the Web browser 340 (S2507). The printer registration screen 600 to the external print service includes a text box 610 for input of the user ID of the account of the external printer services, a text box 611 for input of a password and a registration button 620. In S2508, the printer manager inputs the password and the user ID of the external print service that the manager has acquired in advance respectively into 610, 611 and presses the registration button 620.

In S2509, the external print service printer generating unit 460 acquires registration information from an internal section of the image forming device 110 in response to the depression of the registration button 620. The registration information includes a real printer ID (RPID) and a printer name. The RPID is unique identification information allocated to the image forming device 110. All image forming devices have an RPID in addition to the image forming device 110, and in this manner, an image forming device is uniquely identified. Furthermore, a printer name is a name that is arbitrarily designated to facilitate identification of the image forming device 110 by a printer manager. Generally, a manufacturer or model name is used. This name differs from the RPID, and a printer that is different from the image forming device 110 may have the same printer name. In the present embodiment, although disclosure has been omitted for the purpose of facilitating comprehension of the details of the invention according to the present application, the registration information is not limited to the above, and for example, includes an IP address and the like of the printer depending on the print functions of the printer (double sided printing, stapling). Furthermore, although a MAC address of a printer is an example of an RPID, there is no limitation in this regard. There is no limitation to the format of an RPID as long as the image forming device receives a print job when a user requests a print, and is specified as an image forming device that is connected to the external print service 150 when the print job is transmitted.

Figures 9, 10:
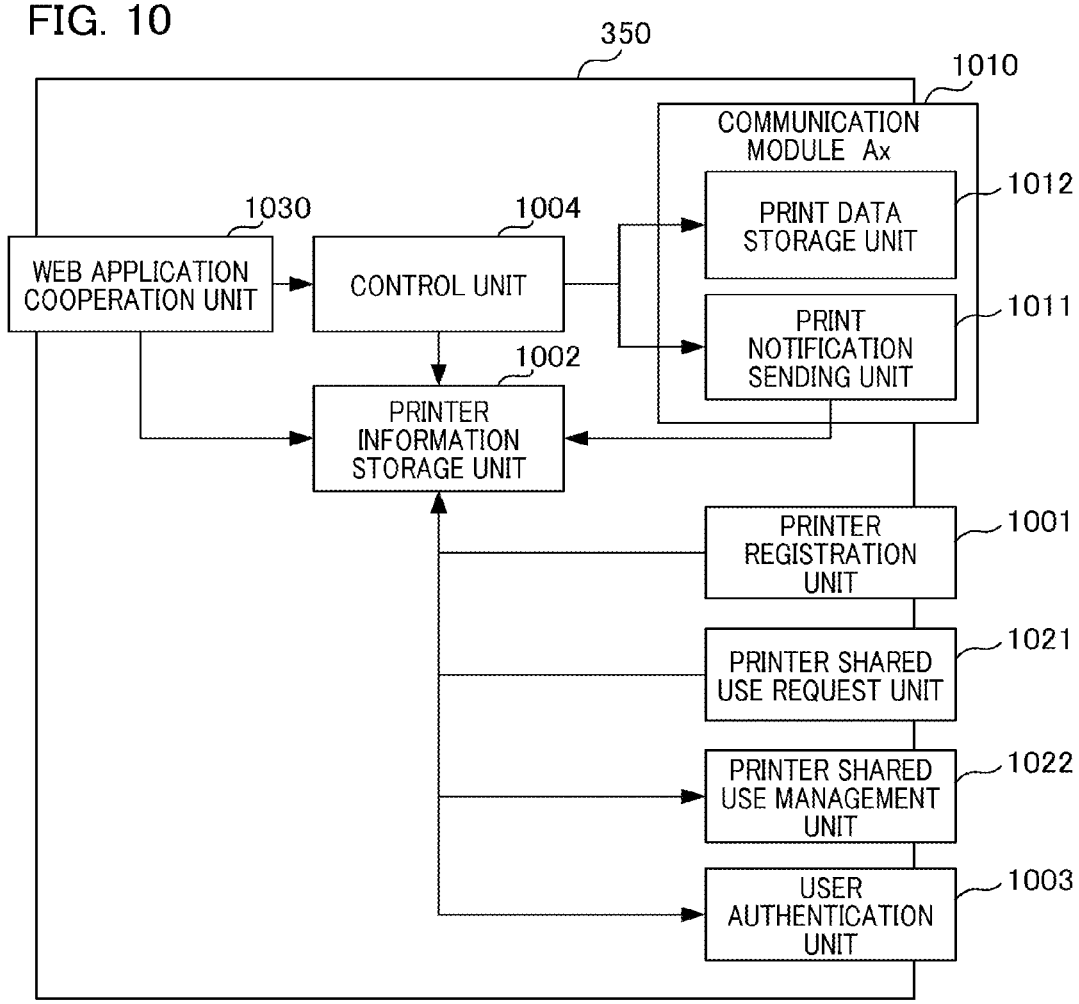
FIG. 9 illustrates printer registration information expressed in XML format.
FIG. 10 is a functional block diagram illustrating an example of print services.

Next, the external print service printer generating unit 460 sends registration information and user authentication information, that is input using the printer registration screen 600 to the external print service, to the printer registration unit 1001 in the external print service 350 (FIG. 10). The user authentication information is a user ID and password. At this time, the print control unit 310 connects to the external print service 350 with reference to the user authentication information for the external print service of the printer manager, and thereafter the connection is maintained. FIG. 9 illustrates an example of printer registration information to a printer registration unit 1001, and a printer name 910 and RPID 920 in the information expressed in XML format are included.

Figure 12A:
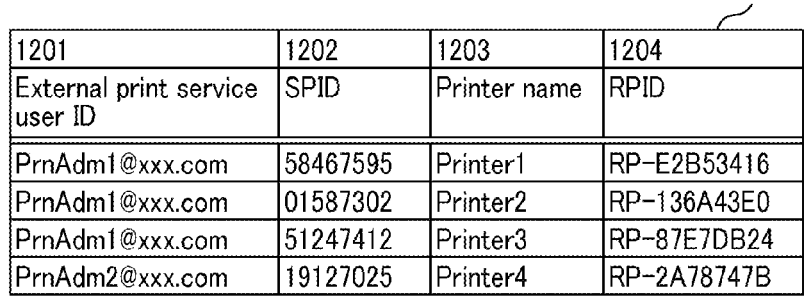
FIG. 12A and FIG. 12B illustrate printer information tables stored by an external print service.
Figure 12B:
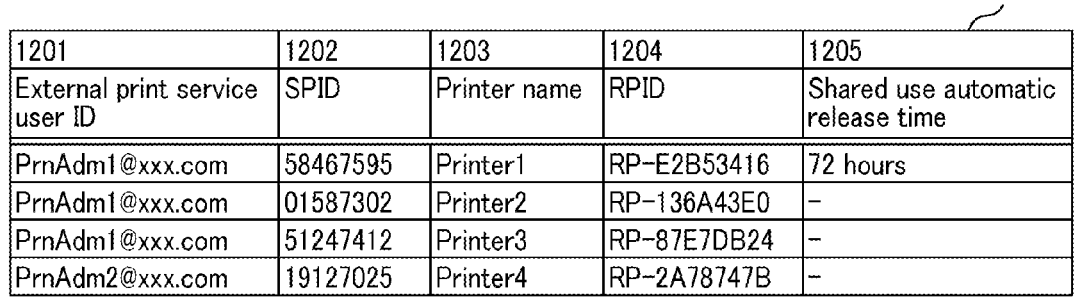

In S2501, the printer registration unit 1001 in receipt of the printer registration information generates a service printer corresponding to the image forming device 110 of the received registration information. The service printer includes a print job queue to store a print job and a process (or thread) to monitor the queue and issue an event to execute subsequent processes. The service printer includes a service printer ID (SPID) for the unique identification of the service printer. The SPID is printer information corresponds with a one to one basis to the actual image forming device 110 (therefore there is a one to one correspondence between the RPID and the SPID). In S2511, the printer registration unit 1001 sends a user ID, SPID and registration information for the external printer services 350 to the printer information storage unit 1002 that functions as a storage unit. In S2512, the printer information storage unit 1002 associates that information for storage as manager printer information. That is to say, the printer registration unit 1001 functions as a registration unit configured to register printer information corresponding to the image forming device used by the manager as manager printer information of. FIG. 12A and FIG. 12B illustrate a printer information table 1200 stored by the printer information storage unit 1002, in which the user ID of the external print service 350 of the printer manager is denoted as 1201, the SPID is denoted as 1202, the printer name is denoted as 1203, and the RPID is denoted as 1204.

Next, the printer registration unit 1001 returns the result of the printer registration to the external print service printer generating unit 460. FIG. 11A illustrates an example expressed in XML in which an SPID 1110 corresponding to the image forming device 110 is allocated. The external print service printer generating unit 460 (FIG. 4) associates the response details, the internal company printer manager ID and the printer manager ID in the external print service 350 and stores them in the external print service information storage unit 480. FIG. 11B illustrates an external print service information table 1120 stored by the external print service information storage unit 480. Reference numeral 1121 denotes the RPID, reference numeral 1122 denotes the SPID, reference numeral 1123 denotes the printer name, reference numeral 1124 denotes the printer manager ID in the external print service, and reference numeral 1125 denotes the internal company printer manager ID. The external print service printer generating unit 460 receives the printer registration result and generates a screen for notification of the result to the printer manager (S2513) for display on the Web browser (S2514). In the above manner, a printer manager can register an internal company image forming device 110 with external print service 350.

Similar aspects related to these functions are described below. A first similar aspect responds to the security problems or difficulties associated with alteration of the manager to another person when an account is input and registered for external print service 350 by the printer manager themselves. Therefore, in substitution therefor, a user ID and password is automatically generated based on information that is specific to the image forming device 110 (for example, the manufacturing serial number). Therefore a user ID 610, and a password 611 may be set from an initial state when the external print service printer generating unit 460 displays the printer registration screen 600 to the external print service.

A second similar aspect may enable registration of an alternate printer manager in order to avoid processing delays when the printer manager is absent. In this configuration, the alternate printer manager may have the same authority as the printer manager, or may have the same authority as the printer manager to an extent delegated by the printer manager.

A third similar aspect may perform operation on another internal company server of all or any one of the internal company authentication processing unit 420, the external print service printer generating unit 460, and the external print service information storage unit 480. This configuration has the advantage that integrated management is enabled in relation to a plurality of image forming devices.

A fourth similar aspect may omit a connection between the external print service printer generating unit 460 and the Web browser 340. The external print service printer generating unit 460 may be provided with a function as described above of connecting with a portion of the setting screen of the printer driver 341 or the display and operation unit 410 belonging to the image forming device 110. This configuration has the advantage of enabling a request even when information such as the URL or IP address of the image forming device 110 is unknown.

Figure 5B:
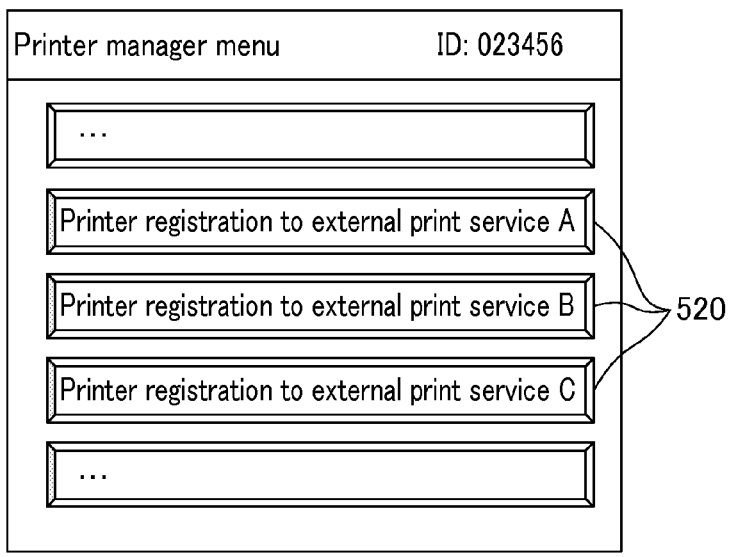
Figure 7:
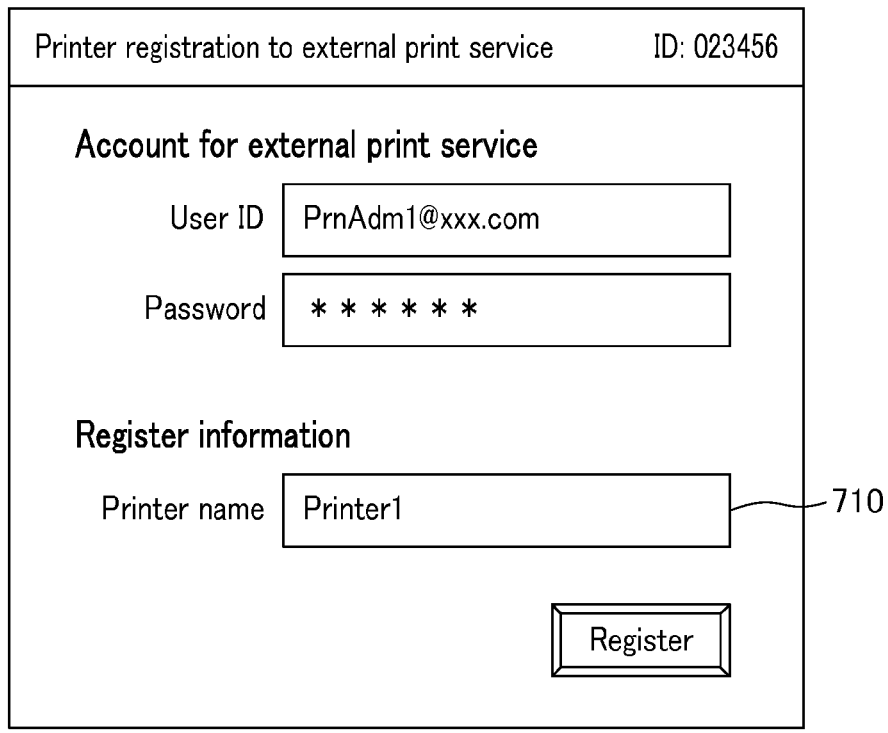
FIG. 7 illustrates a printer registration user interface for an external print service.

A fifth similar aspect may be configured by the printer manager performing the processing sequence of accessing the external print service printer generating unit 460 directly after passing through an internal company authentication for other than the image forming device 110. For example, authentication using Active Directory (registered trademark) is possible. A sixth similar aspect may be configured by designation of the printer name in the registration information by the printer manager by use of the UI such as the text box 710 illustrated in FIG. 7 rather than by automatic use of the printer manufacturer name. A seventh similar aspect may be configured by a printer registration button 520 to respective external print service 350 as illustrated in FIG. 5B because an external print service is not limited to one.

An eighth similar aspect may be configured by sending information indicating that internal company authentication is complete in substitution for the internal company printer manager ID, when the external print service printer generating unit 460 sends information to the printer registration unit 1001. In this manner, a processing sequence creates a reliable connection with the printer registration unit 1001, and may be configuration without storing the internal company printer manager ID 1125 in the printer information table 1200.

Figure 28:
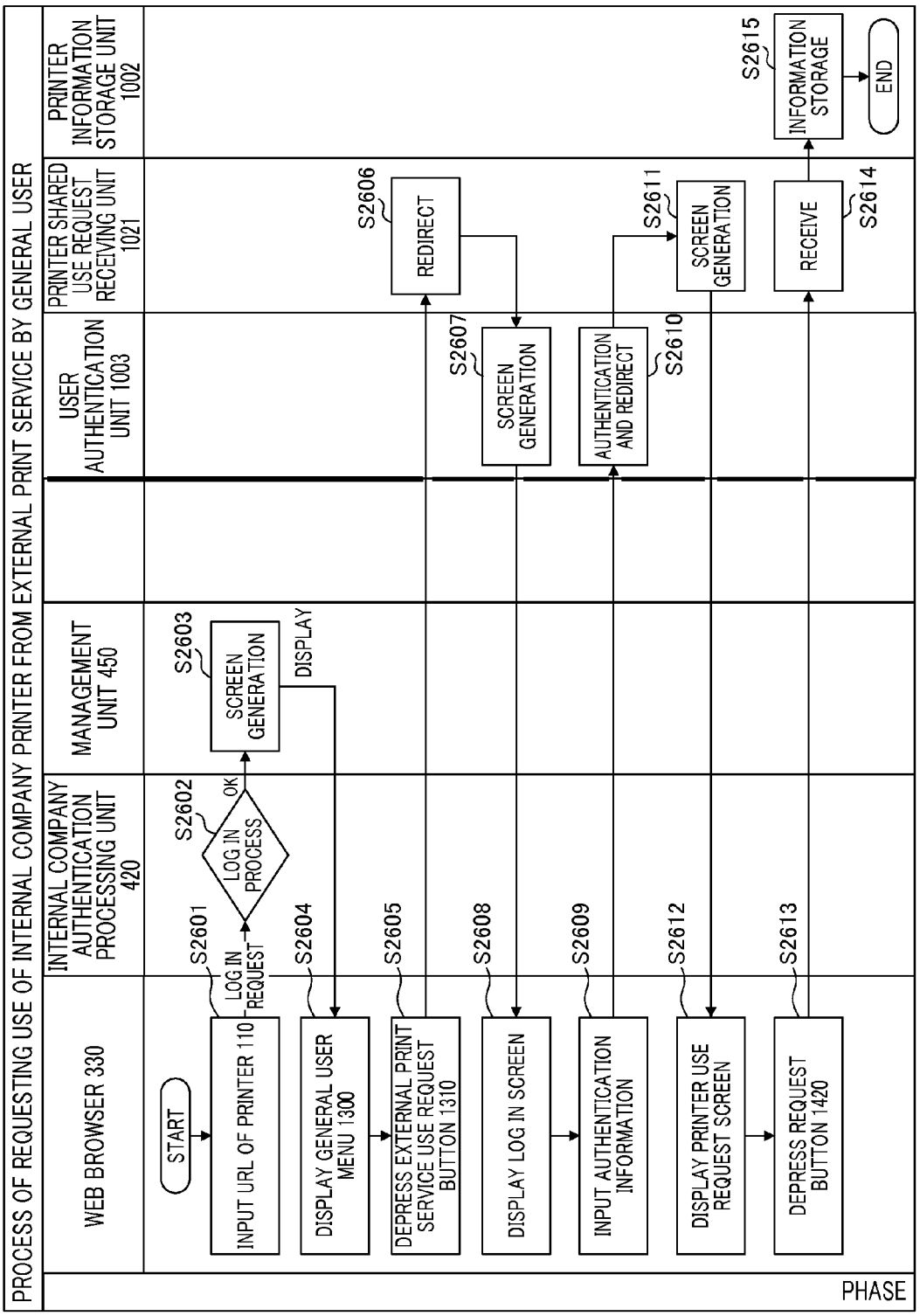
FIG. 28 illustrates a sequence of user request processing for an image forming device.

Next a third function configured by requesting use of an internal company image forming device by a general user from external print service 350 will be described making reference to the sequence in FIG. 28.

Figure 13A:
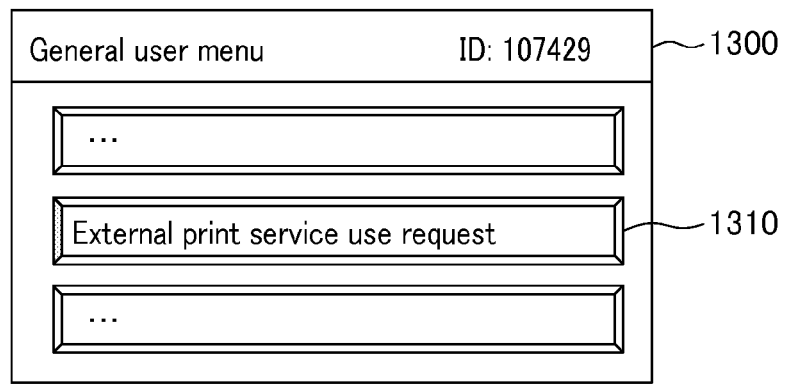
FIG. 13A to FIG. 13C illustrate a menu user interface for a general user.

Firstly, in S2601, a general user logs in as a general user with the internal company authentication processing unit 420 on an image forming device 11 using a Web browser 330 on the general user terminal 130 (S2602). When logged in, the management unit 450 in a step S2603 generates a general user menu 1300 as illustrated in FIG. 13A for display on the Web browser 330 (S2604). That is to say, the management unit 450 functions as a display unit configured to display a shared use request screen that enables request of shared use of an image forming device 110 by a user device operated by a user other than the manager of the image forming device 110. The general user menu 1300 includes an external print service use request button 1310.

In S2605, when a general user presses the button, the management unit 450 redirects the request from the Web browser 330 to the printer shared use request unit 1021 on the external printer service 350 (S2606). In this manner, the printer shared use request unit 1021 receives a request for shared use from the general user. The management unit 450 at this time adds an RPID as shown in 3610 in FIG. 38A to the request. The printer shared use request unit 1021 redirects the RPID to the user authentication unit 1003. In S2607, the user authentication unit 1003 displays a screen requesting log in to the external print service (S2608). In S2609, the general user inputs their user ID and a password for the external print service that have been acquired in advance. In S2610, when authentication is successful, the user authentication unit 1003 redirects the RPID to the printer shared use request unit 1021.

Figure 14A:
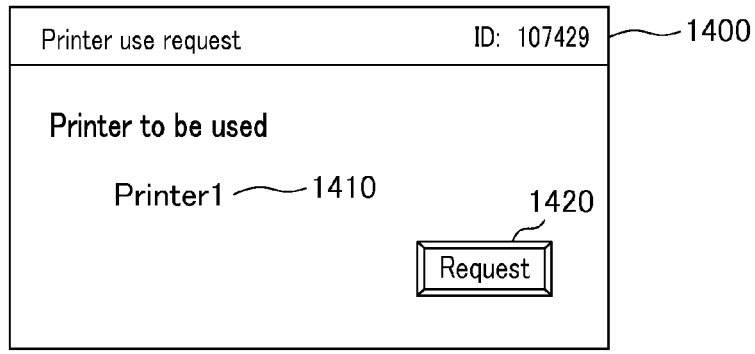
FIG. 14A to FIG. 14D illustrate a user interface for an external print service use request.

In S2611, the printer shared use request unit 1021 after receiving the RPID acquires the printer name corresponding to the RPID by referring to the printer information table 1200 (FIG. 12A), and displays the printer use request screen 1400 illustrated in FIG. 14A (S2612). The printer use request screen 1400 includes a display 1410 of the printer name and the request button 1420. That is to say, the printer shared use request unit 1021 functions as a receiving unit configured to receive a request for shared use of the image forming device by a user on the shared use request screen. When a general user pushes the request button 1420 in S2613, the printer shared use request unit 1021 in S2614 refers to the printer information table 1200 in FIG. 12A to thereby identify the SPID that corresponds to the RPID that is the printer identifier. In S2615, the printer shared use request unit 1021 associates the RPID with the identified SPID, and requests storage of the information in the printer shared use information table 1600 on the printer information storage unit 1002 as illustrated in FIG. 16A to FIG. 16G.

FIG. 16A to FIG. 16G illustrate a printer shared use information table 1600. The SPID is denoted as 1601, the shared use user ID that expresses the user ID of the external print service of the general user is denoted as 1602, and the status expressing the shared use state is denoted as 1603. In this context, the SPID 1601 is the same as the SPID 1202 of the printer information table 1200. In this configuration, the details of the printer information table 1200 and the printer shared use information table 1600 are associated. Furthermore, the status that expresses the shared use state can be configured as two values for example of "request received" and "printing possible". When the printer shared use request unit 1021 requests information storage to the printer information storage unit 1002, the status is set as "request received". As described below, when approved by the printer manager, the status changes to "printing possible". As described above, the general user makes a request for the internal company image forming device 110 from the external print service 350, and use of the image forming device 110 is enabled.

Similar embodiments that are configured in response to the function are described below. One similar embodiment may be configured by a part or all of the functions of the printer shared use request unit 1021 being operated by an internal section of the image forming device 110, the internal company server, or an external company (other than the external print service 350) server. This configuration has the advantage that no change or a small amount of change to the external print service 350 is possible. Even when a shared use request is made by a given method, finally, the printer information storage unit 1002 stores a printer shared use information table 1600 as illustrated in FIG. 16A to FIG. 16G.

A second similar embodiment may be configured by not connecting the printer shared use request unit 1021 to the Web browser 330 on the PC, but rather connecting the printer shared use request unit 1021 to the display and operation unit 410 associated with the image forming device 110. Furthermore, the printer shared use request unit 1021 may be connected with a portion of the setting screen of the printer device 331 on the general user terminal 130 to thereby provide the functions as described below. In this configuration, the display and operation unit 410 of the image forming device 110 displays the printer use request screen 1400 as illustrated in FIG. 14A. The display screen 1400 may display the display and operation unit 410 generated by the printer shared use request unit 1021 and received from the printer shared use request unit 1021, or may display the display and operation unit 410 generated by the management unit 450. This configuration has the advantage that a request is possible even in the absence of information such as the IP address or the URL of the image forming device.

A third similar embodiment is configured in that the internal company authorization system, for example, the authentication authorization unit 320 sends the various types of access rights of a general user that is making a request to the printer shared use request unit 1021 for storage in the printer information storage unit 1002. That is to say, access information related to the access right to the image forming device of a user other than the printer manager is added to the shared use request information, and stored. The use of the access right may assist in the shared use authentication determination performed by the printer manager as described below. For example, 1604 as illustrated in FIG. 16B is configured as a table for transmission and storage of the feature of whether or not a general user making a request has an internal company printer access right, that is to say, of whether or not there is an access right in the local system. The transmitted access right is not necessarily limited to a printer access right, and may be various types of information. The image forming device 110 may send access right information in relation to a data send/receive right or the like for data to be processed, image data such as a printing right, a scanning right, a copying right, a FAX sending right or a FAX receiving right. In this case, a configuration 3620 as illustrated in FIG. 38B may be proposed as an example of information for transmission to the printer shared use request unit 1021.

Furthermore, when the image forming device 110 is a multifunction peripheral, receipt and sending of scanning, copying, FAX transmission, FAX receipt, and data (sending emails, uploading to file server) is possible in addition to execution of printing. When applying the image forming device 110 to this type of information processing system or a plurality of information processing steps, the image forming device 110 functions as an information processing device. The image forming device 110 sends image data such as a printing right, scanning right, copying right, FAX sending right, or FAX receiving right, and an access right information such as data sending/receiving rights for data to be processed, to the printer shared use request unit 1021. The external print services 350 displays the shared use management screen that includes the above types of access right information. In this configuration, in substitution to "permitted" or "not permitted" in 1604 as illustrated in FIG. 16B, for example, a display of "scan permitted" or "scan not permitted" is possible. After the printer manager approves shared use in accordance with the presence or absence of an access right as described above, the external print service 350 executes a request for execution of corresponding information processing to the image forming device 110 in response to the execution request of an approved general user. In this manner, the external print server 150 is not limited to simply sending print jobs, and may also function as a management server for management of the printer. That is to say, the user may confirm a use right in relation to an image forming device that is managed by the external print server 150 by accessing the external print server 150.

A fourth similar embodiment may be configured in which the internal company authentication system sends the internal company user ID of a general user making a request to the printer shared use request unit 1021 and stores it in the printer information storage unit 1002 and thereby assist in the shared use authorization determination performed by the printer manager as described below. When the external print service ID of the general user is not systematized, it is useful to determine the request from a given person. For example, 1605 as illustrated in FIG. 16C is configured as a table for transmission and storage or the internal company user ID of a general user who made a request. Furthermore, information other than the ID may be sent as information facilitating identification of a person or communication with a person (personal name, email address, internal phone number, name of section etc.).

A fifth similar embodiment may be configured by the printer shared use request unit 1021 notifying the printer manager that a request has arrived from a general user. An example of a notification is illustrated in FIG. 17. The timing of the request notification may be performed after detection of a use request under the monitoring process of a request for shared use during a fixed period, or when the number of yet to be authorized use requests is greater than or equal to a predetermined threshold value immediately after the use request, or the above features may be combined. When a request notification is made, there is no limitation in relation to the method of notification sent by the printer shared use request unit 1021. For example, notification may be performed by a push transmission in real-time such as RSS or Atom, or a pull transmission may be performed by acquisition from a browser 340 operated by the printer manager. Furthermore, the URL for the approval screen may be stated as illustrated in FIG. 17. Requests from a plurality of users may be notified on a single occasion. The printer manager inputs authentication information when accessing the notified URL. However, input is not required when authentication is performed in advance. FIG. 17 illustrates an email sent by an email sending unit (not illustrated) provided in the outer printer server 150 to an email address that has been registered in advance by a user manager.

Figure 15A:
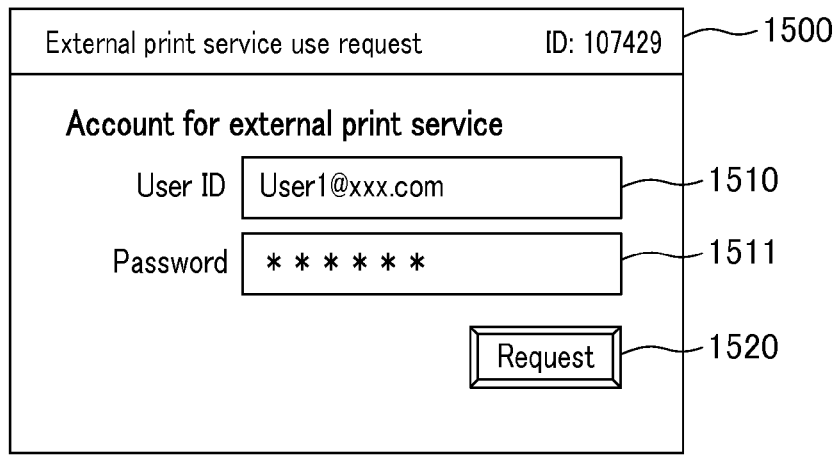
FIG. 15A to FIG. 15C illustrate another user interface for an external print service use request.

A sixth similar embodiment is configured such that the printer shared use request unit 1021 displays a text box 1510 of the external print service for input of a user name as illustrated in FIG. 15A. Furthermore, the printer shared use request unit 1021 also displays a request button 1520 and a text box 1511 for input of the password. In this manner, a function is configured for simultaneously performing request and authentication to the external print service.

Figure 13B:
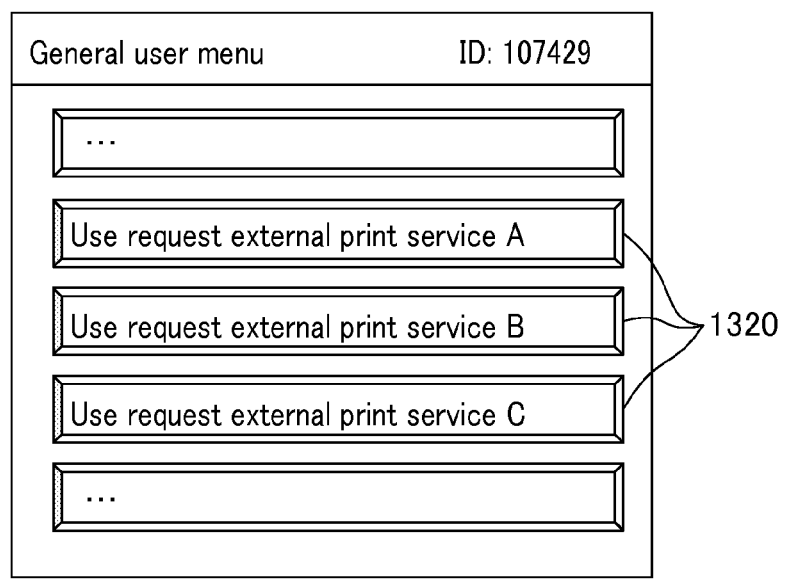
Figure 15B:
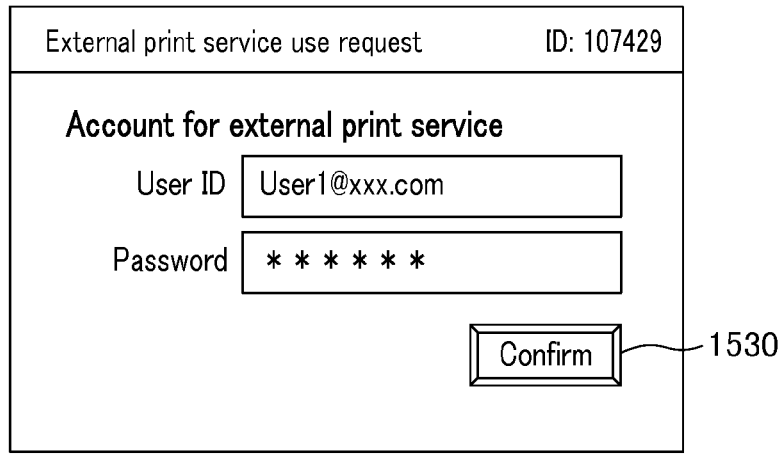
Figure 15C:
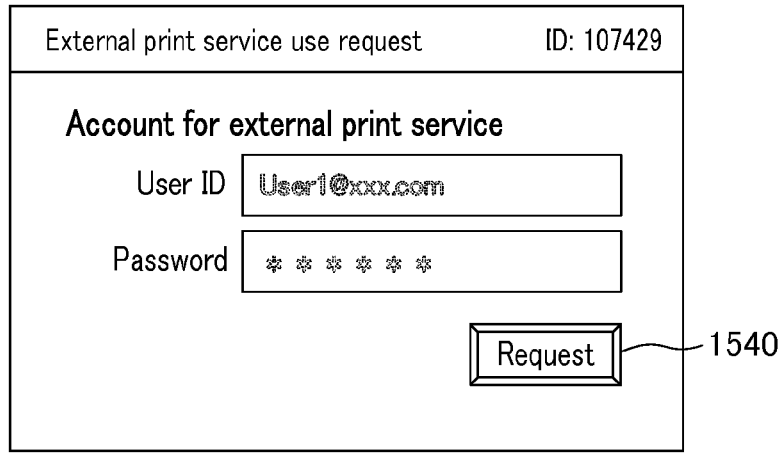

A seventh similar embodiment is configured such that the printer shared use request unit 1021 displays a confirmation button 1530 as illustrated in FIG. 15B that is similar to the request button 1520 illustrated in FIG. 15A to thereby perform early detection of an input error by a user. When the user depresses the confirmation button, confirmation is performed of whether the user ID and the password for the external print service are correct, and when OK, the user ID and the password illustrated in FIG. 15C cannot be changed. After confirmation, the confirmation button 1530 may be changed to the request button 1540. An eighth similar embodiment is not limited to one external print service 350, and may be a user request button for respective external print services as shown by 1320 in FIG. 13B.

Next, a fourth function configured for approval by a printer manager of a printer use request from external print service by a general user will be described making reference to the sequence diagram in FIG. 29.

In S2701, the printer manager connects via a Web browser 340 to the printer shared use management unit 1022 at an arbitrary timing. In S2702, user authentication information for the external print service 350 of the printer manager is input for logging in via connection to the user authentication unit 1003 of the external print service 350. The processing in the steps S2703 to S2705 enables the printer shared use management unit 1022 to display the printer management screen 1800 in S2706.

Figure 18A:
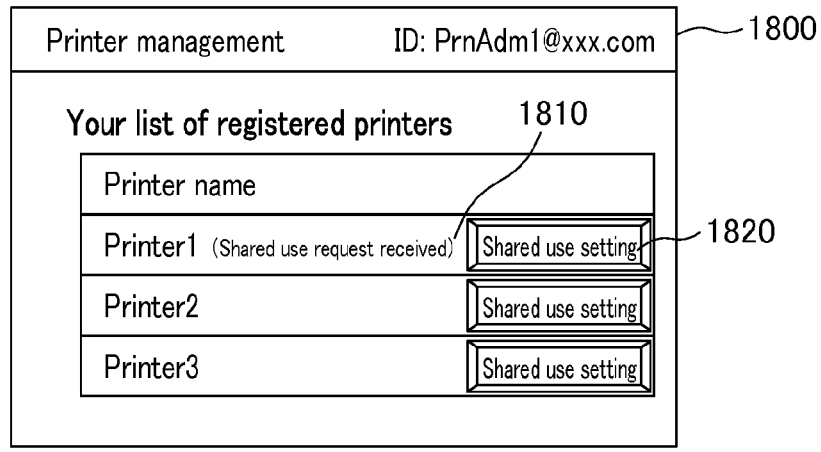
FIG. 18A to FIG. 18C illustrate a printer management menu user interface.
Figure 30:
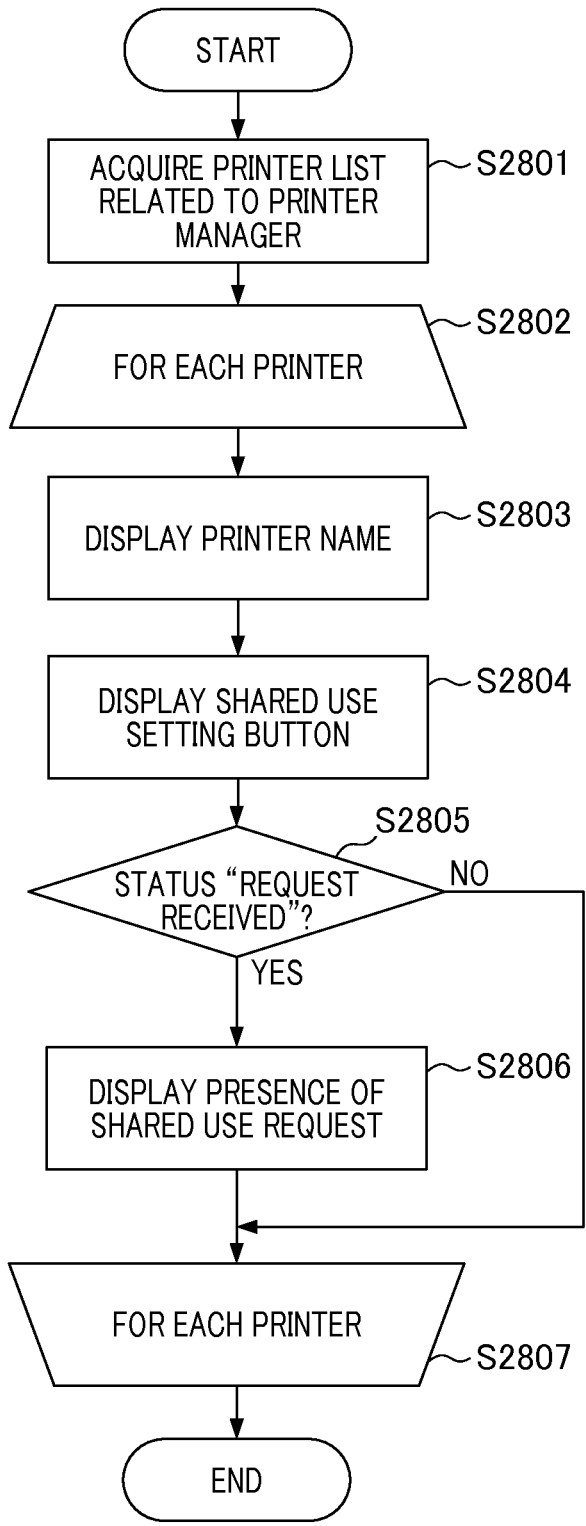
FIG. 30 is a flowchart illustrating a printer list display process.

FIG. 30 illustrates the display logic for the respective screens in S2703 to S2705. In S2801, as illustrated in FIG. 12A, the printer shared use management unit 1022 refers to the printer information table 1200 of the printer information storage unit 1002. Then in S2802, the printer shared use management unit 1022 extracts a printer that matches the user ID of the received printer manager of the external print service and the user ID of the external print service in the table. In S2803 and S2804, the printer shared use management unit 1022 displays a list of printer names and the shared use setting button 1820 associated with each printer name on a list of printer names on the printer management screen 1800 as illustrated in FIG. 18A. At this time, the printer shared use management unit 1022 extracts a data row group in which the SPID 1601 of the printer shared use information table 1600 as illustrated in FIG. 16A to FIG. 16G matches the SPID of the extracted printer. The status 1605 confirms that the term "request received" is present in the data row group (S2805). When present, in S2806, the printer shared use management unit 1022 performs shared use request presence display 1810 as illustrated in FIG. 18A in relation to the printer name display of the printer in the printer list display. The printer shared use management unit 1022 repeats this process for the image forming device (S2807).

Figure 29:
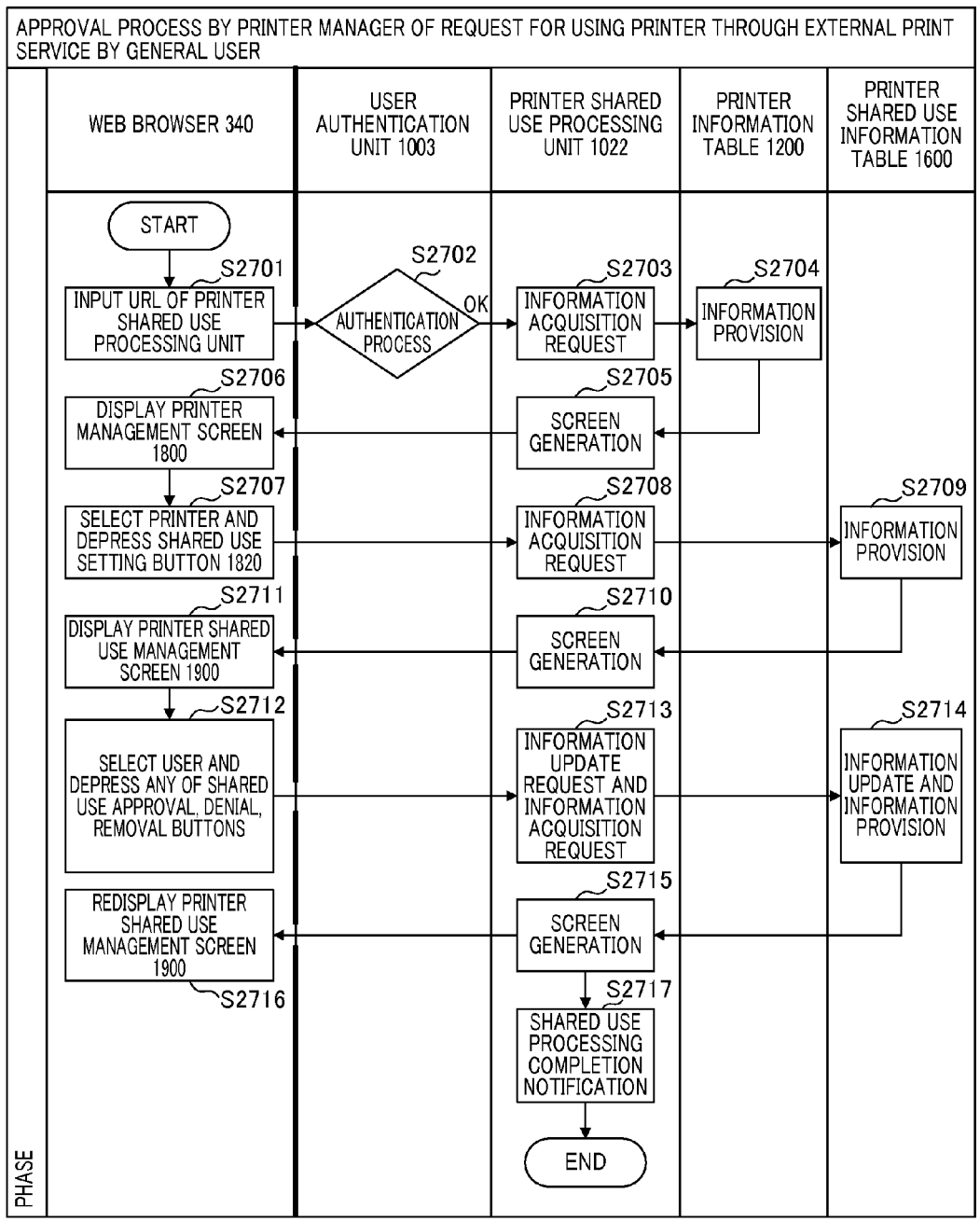
FIG. 29 illustrates a sequence of approval processing of a user request for an image forming device.
Figure 31A:
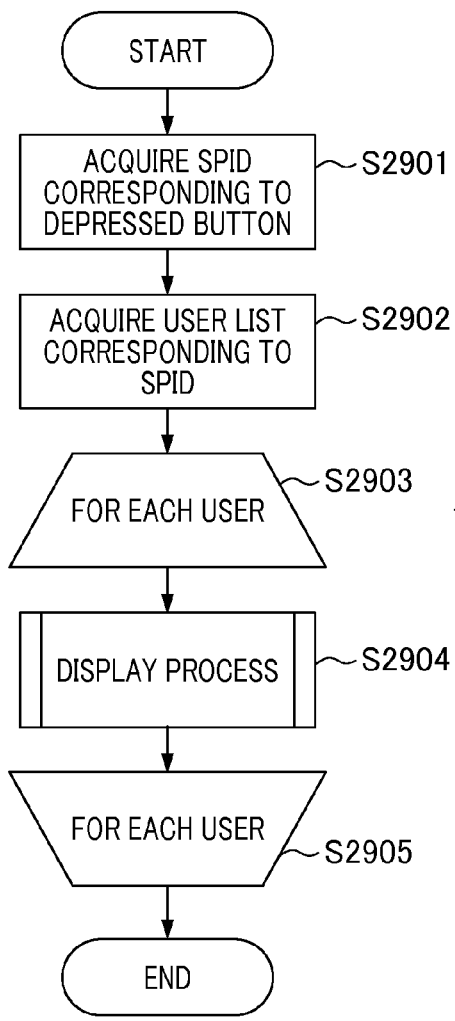
FIG. 31A and FIG. 31B are flowcharts illustrating a user list display process.
Figure 31B:
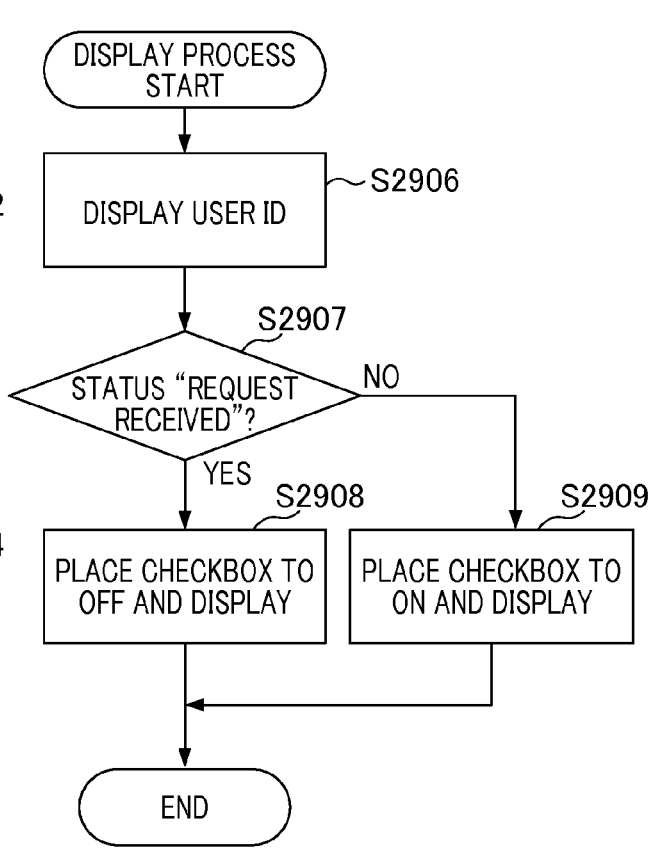

FIG. 31A and FIG. 31B are block diagrams illustrating the display of the screens in S2707 and S2717 as illustrated in FIG. 29. In S2901, the printer manager depresses the shared use setting button 1820 for the printer name subject to shared use request presence display 1810. In response, the printer shared use management unit 1022 in S2902 acquires the SPID corresponding to the depressed button. In S2903, the printer shared use management unit 1022 acquires data for a user having a SPID that matches the SPID 1601 of the printer shared use information table 1600 from the printer shared use information table 1600. In S2904, the printer shared use management unit 1022 generates the printer shared use management screen 1900 for display on the Web browser 340. That is to say, the printer shared use management unit 1022 functions as a generation unit for generation of a setting screen for setting by the manager of whether the request for shared use of the image forming device is approved. The printer shared use management unit 1022 repeats this process in relation to the general user who made the request for shared use (S2905).

In S2906, the printer shared use management unit 1022 displays the user ID on the Web browser 340. As illustrated in FIG. 19A, the printer shared use management screen 1900 includes a data frame of a number that corresponds to the acquired user number. The respective data frames include the user ID display 1920 acquired from the shared use user ID 1602 of the printer shared use information table 1600 and a check box 1930 corresponding to the information acquired from the status 1603. Furthermore, the data frame includes an OK button 1940 and a cancel button 1950.

In S2907, the printer shared use management unit 1022 determines whether the status is "request received" or "printing possible". When the status 1603 is "request received", the printer shared use management unit 1022 displays the check box 1930 in a check-off state (S2908). When the status 1603 is "printing possible", the printer shared use management unit 1022 displays a check-on state (S2909). The printer manager operates the check button to thereby enable change of the check state. When the printer manager depresses the cancel button, no change is made to the stored information, and the processing returns to the printer management screen 1800.

Figures 22, 23:
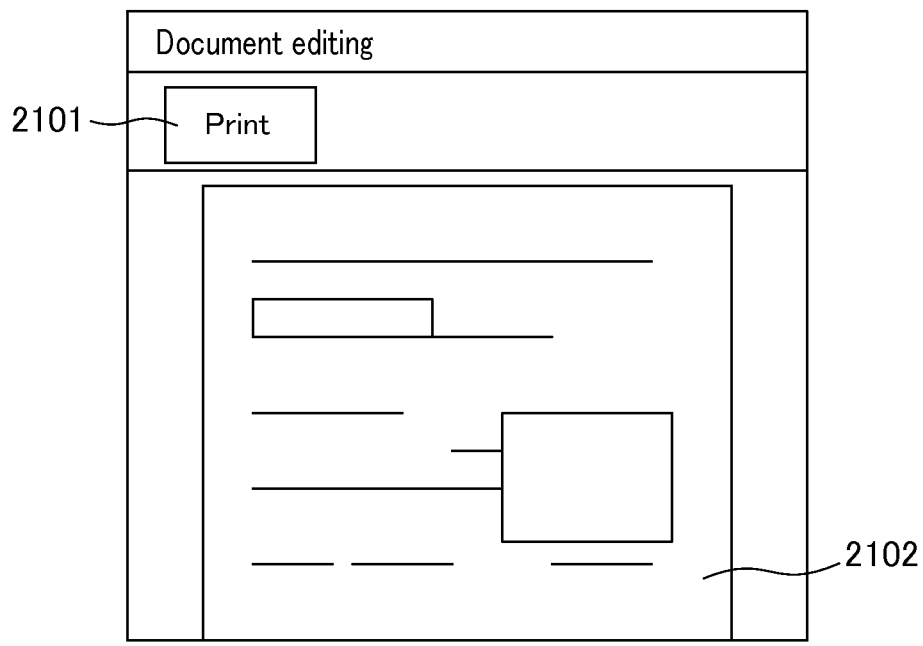
FIG. 22 illustrates a printer use approval notification for an external print service.
FIG. 23 illustrates a Web application for document preparation and editing.

When the printer manager depresses the OK button 1940, the printer shared use management unit 1022 performs a process reading the changed state of the check box. The printer shared use management unit 1022 changes the status 1603 of the user corresponding to the printer shared use information table 1600 to "printing possible" for a user in relation to whom the check box changes from off to on. Conversely, the row of the user corresponding to the printer shared use information table 1600 is removed for a user o which the check box changes from on to off. When performing any of the above processes, the printer shared use management unit 1022 notifies the point of contact associated with the ID 1920 of the user that the printer manager has performed a given operation. FIG. 22 illustrates an example of a notification for shared use approval.

As described above, the printer manager refers to an internal company printer access right as materials for the determination, and can thereby approval or deny the printer use request from external print service by a general user. When the manager denies the use of the image forming device by a general user, the general user may be notified of the denial. Notification can be made to the general user by use of the same technique as the notification of a use request as described above. In this configuration, the printing server 150 must record the point of contact of the general user in advance. For example, transmission may be made to the print services 350 in addition to the point of contact itself when the general user makes a use request.

Similar aspects proposed in relation to the function of the printer manager approving the printer use request from the external print service by a general user will be described below. A first similar aspect is configured by the provision of the screen illustrated in FIG. 19B since the active denial is not possible when the UI is shown as illustrated in FIG. 19A. In the screen illustrated in FIG. 19B, the printer shared use management unit 1022 distributes and displays a button based on the status 1603 in the shared use setting operation and display unit 1960. In this example, the distributed button displays the approve button 1961 and the deny button 1962 when the status 1605 is "request received", and the release button 1963 is displayed when the status is "printing possible". The processing executed by the printer shared use management unit 1022 when the approval button 1961 is depressed the same processing when the check box 1930 is changed from off to on and the OK button 1940 is depressed. The processing of the printer shared use management unit 1022 when the deny button or the release button is depressed is same processing when the check box 1930 is changed from on to off and the OK button 1940.

A second similar aspect is described. There is difficulty in specifying the user since only the user ID of the external print service 350 is displayed when the UI is shown as illustrated in FIG. 19A. The printer shared use management unit 1022 may display the incidental information related to the user such as the internal company user ID 1970 illustrated in FIG. 19C. In this case, the printer shared use management unit 1022 may acquire internal company user information from the printer shared use information table in advance as illustrated in FIG. 16C and store in the printer information storage unit 1002.

A third similar aspect is described. There is the possibility that the printer manager wonders whether to allow printing by the user through the external print service 350 when the UI is shown as illustrated in FIG. 19A. As illustrated in FIG. 20A, the printer shared use management unit 1022 displays the internal company printer access right display 1980 to thereby assist the determination by the printer manager. The printer shared use management unit 1022 displays for example "○ in the company, use of this printer is allowed" in green letters when the corresponding status is "request received" and the corresponding internal company printer access right 1604 is "permitted". If however the corresponding status is "request received" and the corresponding internal company printer access right 1604 is "not permitted", "x in the company, use of this printer is not allowed" is displayed in red letters. If the corresponding status is "printing allowed", "—" is displayed.

The following situations are proposed as situations in the company in which printing is allowed from external print service 350 for a user without a printing access right, and includes for example, the situation in which personnel are temporarily placed at a business center and are not permanent staff. During visits, sales staff wants to print documents prepared using Web applications during business travel. Furthermore, in this context, although the example of internal company printer access rights was used, the printer shared use management unit 1022 may perform display using another access right, or may change the display in response to a combination of a plurality of access rights. For example, such displays include "in the company, a FAX right is available in relation to the print, but a printing right is not available". In this configuration, the printer shared use management unit 1022 may acquire internal company access right information in the printer shared use information table in advance as illustrated in FIG. 16B and store in the printer information storage unit 1002.

A fourth similar aspect may be configured by operating a part or all of the functions of the printer shared use management unit 1022 on an internal company server. This configuration has the advantage of facilitating the customizing of the shared use authorization process for each company that uses the external print service 350.

As illustrated in FIG. 19, there is no limitation to the description of the configuration in which the printer shared use management screen corresponds to a single printer. For example, the printer shared use management unit 1022 may display at the same time on the screen a shared use setting for "Printer 2" in addition to "Printer 1". In this configuration, the printer manager may summarize the shared use setting in relation to a plurality of printers. The information related to the shared use settings for example is sent from the Web browser 340 to the printing services 350 or from the printing services 350 to the Web browser 340 using a single transmission. In this manner, there is no limitation in relation to the method of displaying the screen for performance of the shared use settings for the image forming device 110.

Finally, the function will be described in which the printer manager or the general user prints from a Web application 360 through the external print service 350 on an internal company image forming device 110. In order to facilitate comprehension of the present invention, the description will focus on the different operations when the printer manager themselves instructs printing and when a general user permitted to print by shared use instructs printing. For the sake of simplicity, the description in relation to the data or UI of the printing setting will be omitted.

Firstly, the printer manager accesses via a Web browser 340 to a Web application 360. The Web application 360 provides a document preparation service. An image example prepared by use of the Web application 360 is illustrated in FIG. 23. Reference numeral 2101 denotes the print button, reference numeral 2102 denotes the document prepared by the printer manager. The printer manager who wants to print the document 2102 presses the print button 2101. As a result of pressing, the Web application 360 sends user identification information for the printer manager through the Web browser 340 to the Web application cooperation unit 1030 of the external print service 350. At the same time, the Web application 360 requests a printer list corresponding to the printer manager.

The Web application cooperation unit 1030 of the external print service 350 acquires data included in row of which the received user ID matches the user ID 1201 through the control unit 1004 from the printing information table 1200 stored in the print information storage unit 1002. The Web application cooperation unit 1030 returns the acquired data to the Web application 360. In the circumstances of a general user, the operation is different. Since the user ID of the general user does not match the user ID 1201 of the printer information table 1200, the Web application cooperation unit 1030 refers to the printer shared use information table 1600. The Web application cooperation unit 1030 extracts data row in which the user ID of the general user matches the shared use user ID 1602. Then when the status 1605 of the extracted row shows "printing possible", the SPID of that row and row data in the printing information table 1200 corresponding to the SPID are returned to the Web application 360.

The Web application 360 displays the printable printer list based on the received printer information for selection by a user (printer manager or general user). Then, The Web application 360 send the SPID for the printer selected by the user to the Web application cooperation unit 1030 of the external print service 350.

Then, the Web application 360 sends the data for the selected document to the Web application cooperation unit 1030. The control unit 1004 converts the print data as required and stores the print data in the print data storage unit 1012.

The control unit 1004 specifies the communication session A connected to the printer based on the SPID of the printer selected by the user. The control unit 1004 instructs a print notification sending unit 1011 to send notification information showing that the print data is prepared to the specified image forming device. The print notification receiving unit 491 of the print control unit 310 provided in the image forming device 110 receives notification information. The print notification receiving unit 491 passes the storage position information for the print data contains in the notification information to the print data acquisition unit 492. The print data acquisition unit 492 connects to the print data storage unit 1012 through the communication session B based on the storage position information to thereby acquire print data. Then, the print data acquisition unit 492 performs a print instruction to the print execution unit 440 that functions as the print execution means. That is to say, the control unit 1004, the print notification sending unit 1011 and the print data storage unit 1012 function as a provision means configured to provide a print job to the image forming device in accordance with a printing request from a user in response to approval from a manager via the setting screen.

The communication session A and the communication session B as used herein are established by use of user authentication information for the printer manager. There is no use of user authentication information for a general user. In this manner, the printer manager or the general user can print from a Web application through the external print service with an internal company image forming device.

According to the printing system in the present embodiment, shared use by a plurality of general users of an image forming device managed by a printer manager through external print service can be executed while ensuring security.

Second Embodiment

The first embodiment described an example in which the approval determination of a printer manager was assisted by display of an internal company printer access right display 1980 in a printer shared use management screen 1900 based on an access right to an internal company image forming device 110. In the second embodiment, automatic shared use approval and shared use denial is enabled based on an access right to an internal company image forming device 110 in order to further reduce the burden on a printer manager.

The second embodiment includes two processes. The first process is a process configured to enable setting of automatic approval/denial by a printer manager in relation to respective image forming devices after the "process of registration by a printer manager of an internal company image forming device with the external print service" according to the first embodiment. The second is the process of automatic operation of shared use approval and denial after the "process of request by a general user for use of an internal company image forming device from external print service".

Figure 32A:
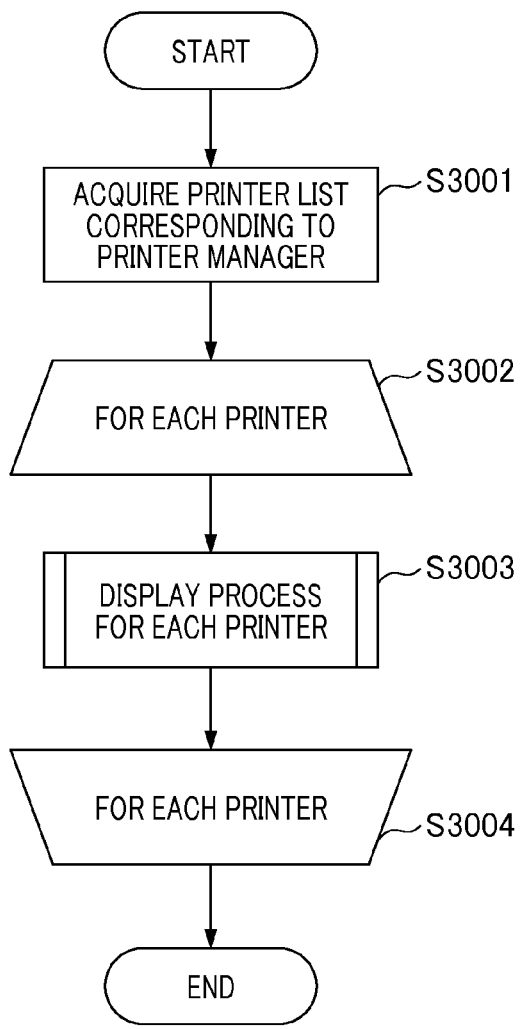
FIG. 32A and FIG. 32B are flowcharts illustrating a printer list display process including an automatic approval/denial setting button.
Figure 32B:
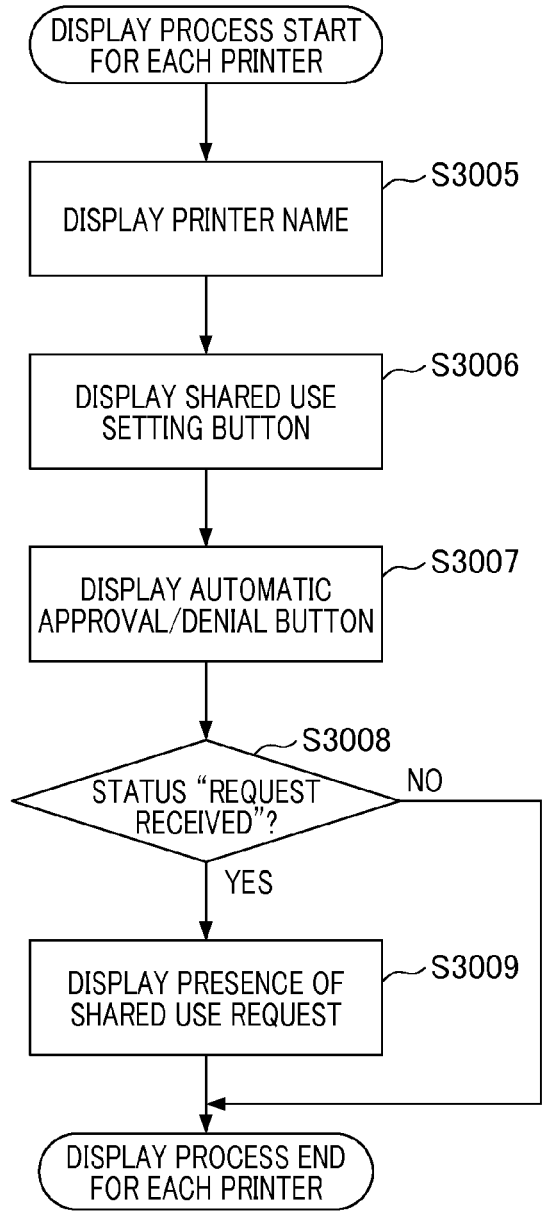

Firstly, the first function will be described with respect to the setting of automatic shared use approval/denial by a printer manager in relation to respective image forming devices 110. When the printer manager logs in from a Web browser 340 and accesses to a printer shared use management unit 1022, the printer shared use management unit 1022 as illustrated in FIG. 24 displays a list of printer names already recorded in the printer management screen 1800. In this context, an automatic approval/denial setting button 2210 is allocated in relation to respective printer names in the printer name list. FIG. 32A and FIG. 32B illustrates the display logic for a printer management screen. Here, the first embodiment described by reference to FIG. 30, FIG. 31A and FIG. 31B differs from the second embodiment in relation to S3007. The processes of S3001 to S3009 with the exception of S3007 are the same as the processes described in relation to FIG. 31A and FIG. 31B and therefore description will not be repeated.

In S3007, the printer shared use management unit 1022 displays the management screen including the automatic approval/denial setting button 2210. When the printer manager depresses the automatic approval/denial setting button 2210, the printer shared use management unit 1022 acquires the SPID corresponding to the printer name that correlates with the depressed button for display on the automatic approval/denial setting screen 2300. The automatic approval/denial setting screen 2300 includes a check box 2310 that enables the operation for invalidation or validation of the setting for automatic approval of the use request from the user. The user in this situation is a user that is allowed to print within the company using a printer specified by the SPID. The automatic approval/denial setting screen 2300 includes a check box 2320 that enables the operation for invalidation or validation of the setting for automatic denial of the use request from the user that is not allowed to print within the company using a printer specified by the SPID. The automatic approval/denial setting screen 2300 includes a setting button 2330 to store the operation result of the checkbox group and a cancel button 2340 to maintain the setting in a current state by discarding the operation of the checkbox group. The following situations can be proposed as situations for enabling a user without an internal company printing access right to print using the external print service. For example, personnel may be temporarily placed at a business center and are not permanent staff. During business travel, sales staff who visits a sales office due to an outside job may want to print documents prepared using Web applications at destination for a business travel.

The printer information storage unit 1002 stores the automatic approval/denial setting table 2400 as illustrated in FIG. 26 in accordance with the automatic approval/denial setting screen. The automatic approval/denial setting table 2400 includes an SPID 2401, an automatic approval 2402, and an automatic denial 2403. The printer information storage unit 1002 reads information for the automatic approval 2402 and the automatic denial 2403 from the target SPID 2401 of the automatic approval/denial setting table 2400 before displaying the automatic approval/denial setting screen 2300 as illustrated in FIG. 25. When the printer information storage unit 1002 displays the automatic approval/denial setting screen 2300, if the automatic approval 2402 is "valid", the checkbox 2310 has a valid display, and when "invalid" the checkbox 2310 has an invalid display. In the same manner, if the automatic denial 2403 is "valid", the printer information storage unit 1002 performs a valid display on the checkbox 2320, and when "invalid" the checkbox 2320 has an invalid display. When the printer manager depresses the setting button 2330, the printer shared use management unit 1022 configures the automatic approval of the SPID 2401 corresponding to the automatic approval/denial setting table 2400 as "valid" when the state of the checkbox 2310 is valid. The printer shared use management unit 1022 configures "invalid" when the state of the checkbox 2310 is invalid. In the same manner, when the checkbox 2320 state is valid, the printer shared use management unit 1022 configures the automatic denial 2403 of the SPID 2401 corresponding to the automatic approval/denial setting table 2400 to "valid", and the printer shared use management unit 1022 configures "invalid" when the state of the checkbox 2320 is invalid. In this manner, a setting can be automatically performed for the approval/denial of shared use by a printer manager in relation to respective image forming devices.

Figure 33A:
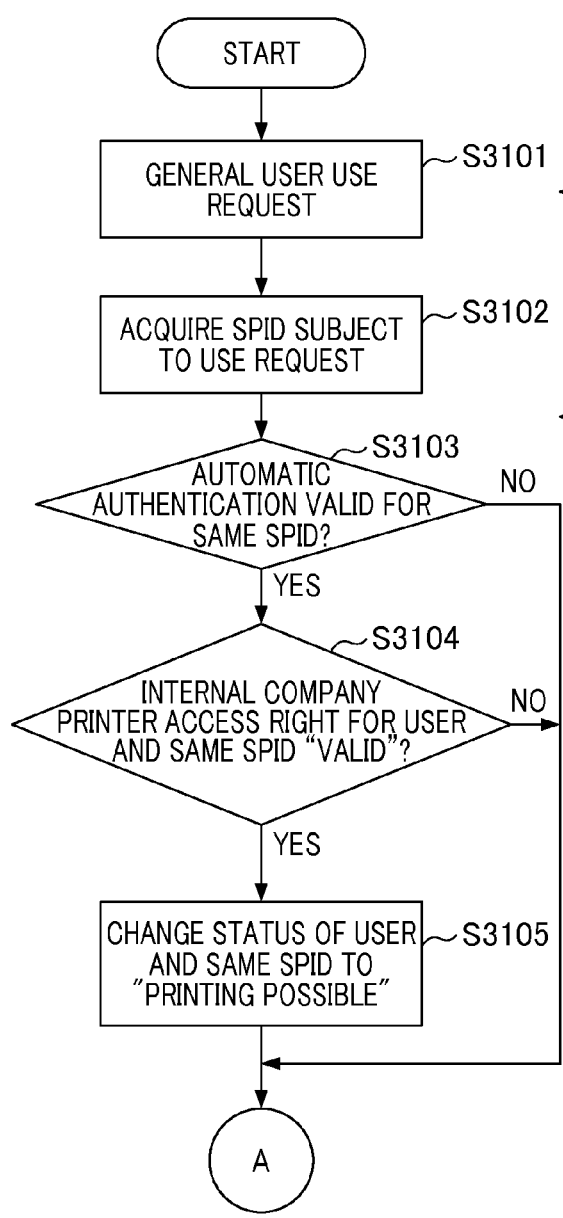
FIG. 33A and FIG. 33B are flowcharts illustrating an automatic approval/denial process.
Figure 33B:
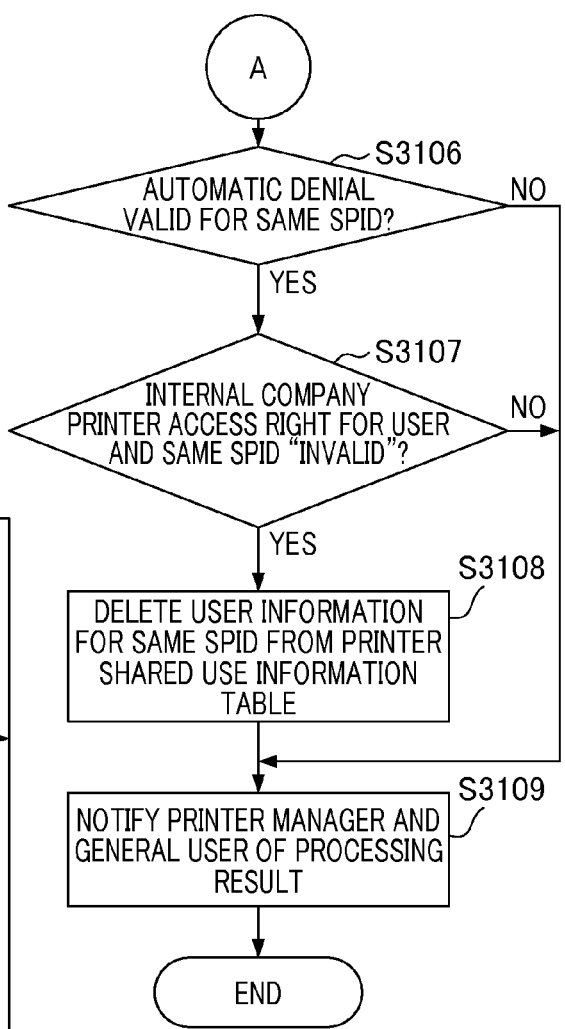
Figure 34:
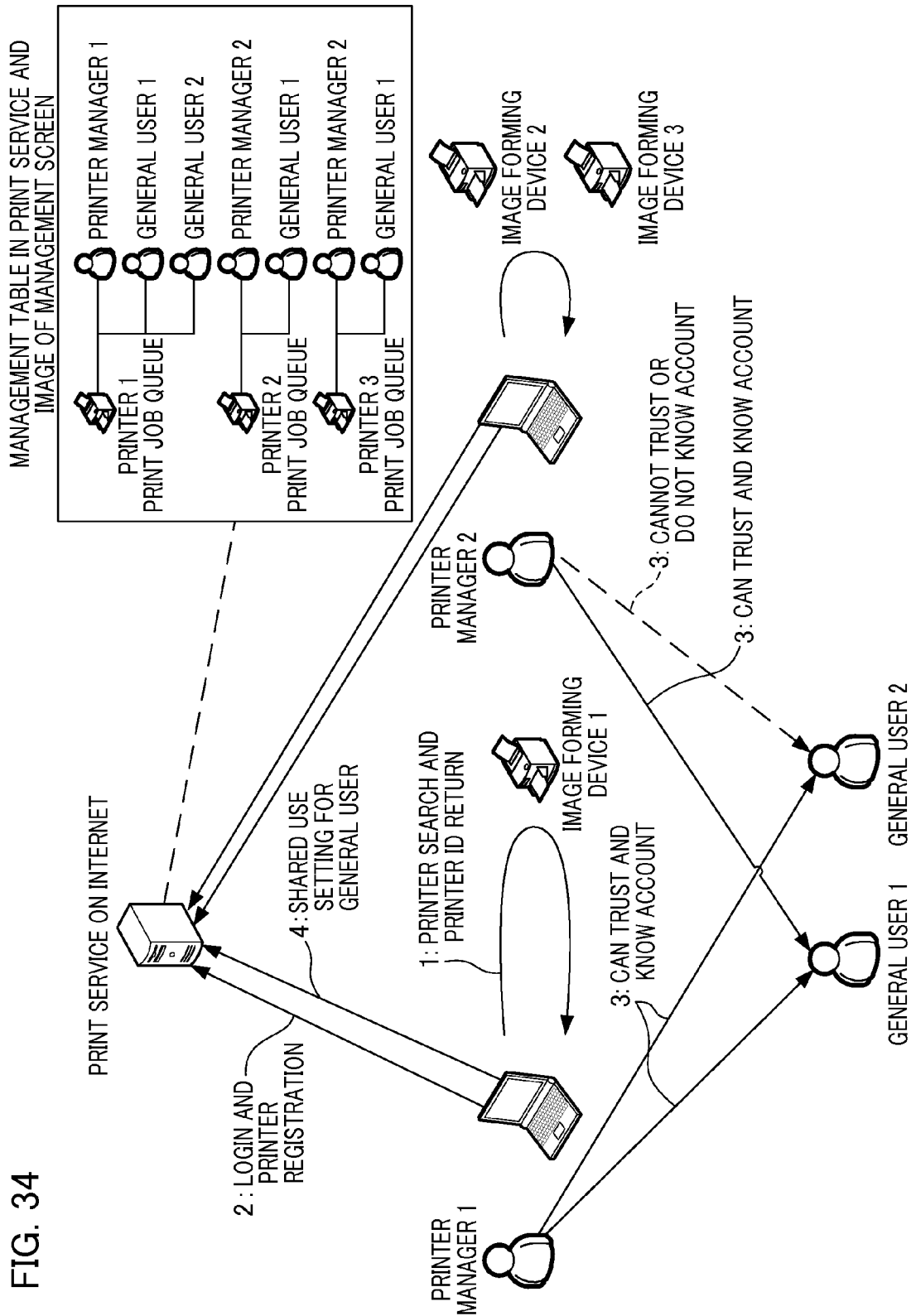
FIG. 34 illustrates a shared use setting for a conventional external print service.

Next, a second aspect will be described in relation to the process of automatic shared use approval and denial after a use request from a general user. In the first embodiment, a general user depresses the request button 1520 on the external print service use request screen 1500. Thereafter, the printer shared use request unit 1021 sets the status 1603 of the SPID 1601 corresponding to the printer shared use information table 1600 of the printer information storage unit 1002 to "request received". In the second embodiment, the processing as illustrated in FIG. 33A and FIG. 33B at that timing is performed.

Firstly, in S3101, a general user performs a use request to the printer shared use request unit 1021. The printer shared use request unit 1021 notifies the printer shared use management unit 1022 of the request together with the SPID and the shared use user ID. In S3102, the printer shared use management unit 1022 acquires the SPID. In S3103, the printer shared use management unit 1022 confirms whether either one of the automatic approval or the automatic denial of the automatic approval/denial setting table 2400 as illustrated in FIG. 26 in accordance with the SPID is valid. When both are invalid, the above processing is not performed.

When the automatic approval is valid, the printer shared use management unit 1022 in S3104 refers to the internal company printer access right in the data row specified by the shared use user ID and the SPID from the printer shared use information table 1600. When the access right is "permitted", the status 1603 in the same row in S3105 is configured as "printed possible". When the access right is "not permitted", no action is performed.

In S3106, when the automatic denial is valid, reference is made to the internal company printer access right in the data row specified by the shared use user ID and the SPID from the printer shared use information table 1600 illustrated in FIG. 16B (S3107). Then in S3108, when "not permitted", the row is removed. The printer shared use management unit 1022 performs no action when the access right is "permitted". That is to say, the printer shared use management unit 1022 automatically approves or automatically denies the request for shared use of the image forming device 110 based on the access right information included in the share use request information and the setting details on the automatic approval/denial setting screen. When a given process is automatically performed, the printer shared use management unit 1022 transmits the contents of the processing to the printer shared use request unit 1021. In this case, the printer shared use request unit 1021 notifies the general user and the printer manager of the details of the processing (S3109).

In this manner, approval or denial for shared use can be performed by an automatic operation after a use request from a general user. Automatic approval or denial can be performed by the two processes described above. Therefore, the burden on the printer manager can be reduced. Furthermore, even when a printer manager is not present when a general user wishes to use printing services urgently, the general user can use the printing services without waiting for an approval request instruction from the printer manager.

Similar aspects proposed in relation to these functions are described below. A first similar aspect may set the authority in relation to rights other than printing rights for an automatic determination when the internal company printer access right includes a range of content. For example, when the image forming device is a multifunction peripheral, the option of approving the automatic shared use may be set when there is a copying right.

A second similar aspect may set a combination of a plurality of authorities for an automatic determination when the internal company printer access right includes a range of content. For example, when the image forming device is a multifunction peripheral, the option of approving the automatic shared use may be set when there is a printing right and a FAX sending right. A third similar aspect assumes a configuration in which there has not been a change in the internal company printer access right, or when there has been a change upon a check at a fixed interval. In this configuration, the printer shared use management unit 1022 may add a record to that effect to the printer shared use information table, perform a display to that effect on the printer management screen and perform shared use release (denial) automatically.

Third Embodiment

Although printing by use of a Web application through external print service 350 by a company may be convenient and effective, implementation of a policy of limited use may be assumed due to concerns regarding security. The application of limited use includes a method of approval upon suitable use request when use is required and deletion of the record upon completion of use. The method of deletion includes a method of (1) request of completion of use by the user, and (2) automatic deletion after a fixed period from the final use or the use request will be considered. A means for realizing the two methods will be described below.

Figure 13C:
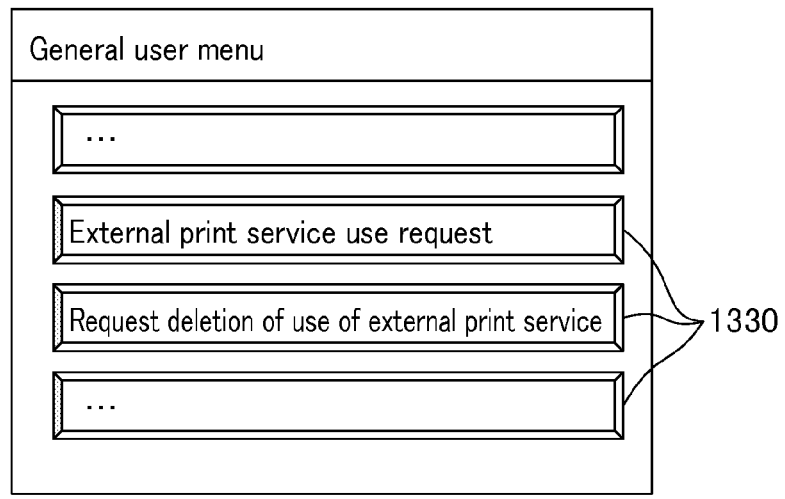
Figure 14B:
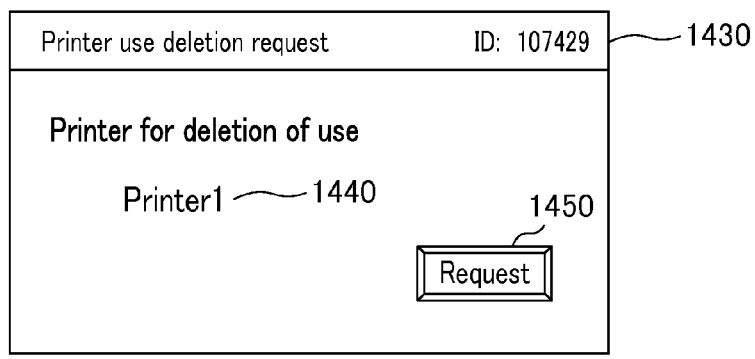

Firstly, (1) a means of request of completion of use to the user will be described. The management unit 450 displays a use deletion button as illustrated in 1330 in FIG. 13C in the general user menu. When the general user depresses this button, the management unit 450 redirects the request from the Web browser 330 to the printer shared use request unit 1021 on the external print service 350. The management unit 450 at this time redirects by addition of the RPID to the request. After authentication of the external print service 350, the printer shared use request unit 1021 acquires the printer name corresponding to the RPID by reference to the printer information table 1200, and displays a printer use deletion request screen 1430 as illustrated in FIG. 14B. The printer use deletion request screen 1430 includes a display 1440 of the printer name and a request button 1450. When the general user depresses the request button 1450, the printer shared use request unit 1021 acquires the SPID corresponding to the RPID from the printer information table 1200. The printer shared use request unit 1021 removes the shared use information associated with the SPID and the general user ID from the printer shared use information table 1600 on the printer information storage unit 1002.

Figure 14C:
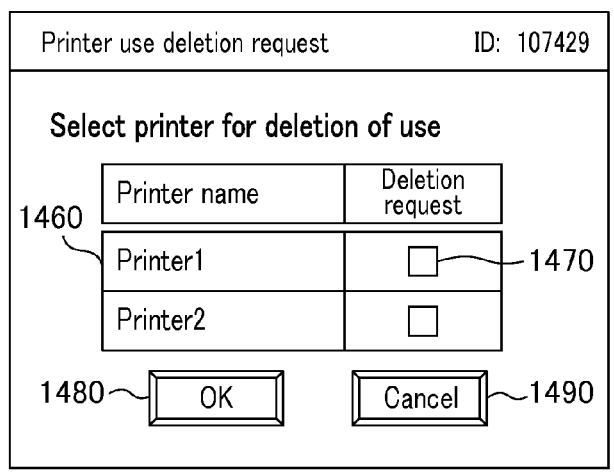

Similar aspects related to functions of this type of authentication system are described below. A first similar aspect may be configured with reference to the example above by enabling a single deletion of the image forming device 110 that can be used by the general user themselves. However a collective deletion is also possible. In this configuration, the printer shared use request unit 1021 acquires the shared use printer information associated with the ID of the general user from the printer shared use information table 1600 and displays the screen illustrated in FIG. 14C. This screen includes a list 1460 of printer names, a checkbox 1470 corresponding to each printer name, an OK button 1480, and a cancel button 1490. The general user checks the checkbox 1470 into the ON state and depresses the OK button 1480, and thereby the printer shared use request unit 1021 removes the checked image forming device from the printer shared use information table 1600.

A second similar aspect may be configured with reference to the above example by incorporating automatic deletion of shared use information after a deletion request from a general user. However, the printer manager may also approve deletion. In this configuration, after a general user requests deletion, removal is not performed immediately from the printer shared use information table 1600, and a record is created that a deletion request has been made as illustrated in the deletion request 1606 in FIG. 16D. Then the printer shared use management unit 1022 displays the printer shared use management screen 1900 illustrated in FIG. 20B with reference to 1606. The screen includes a deletion request presence/absence display 1990 from a general user, and the printer manager can determine whether or not to release the shared use based on the display.

Figure 8:
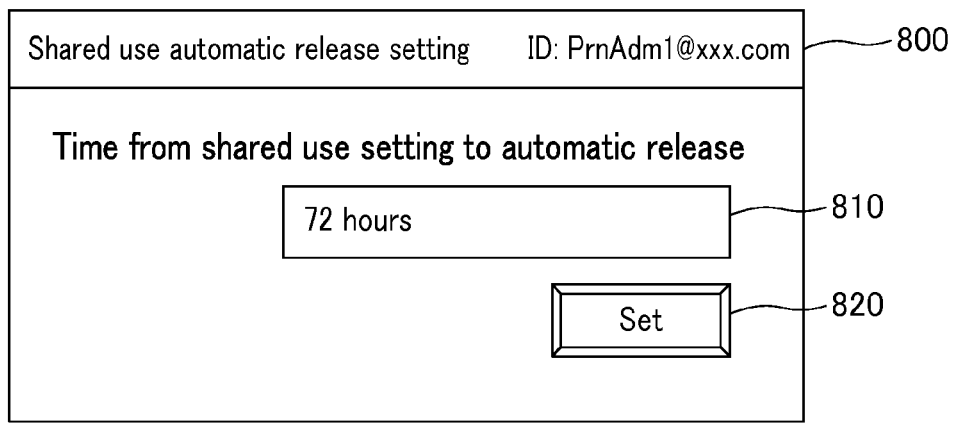
FIG. 8 is a shared use automatic release setting screen user interface.
Figure 18B:
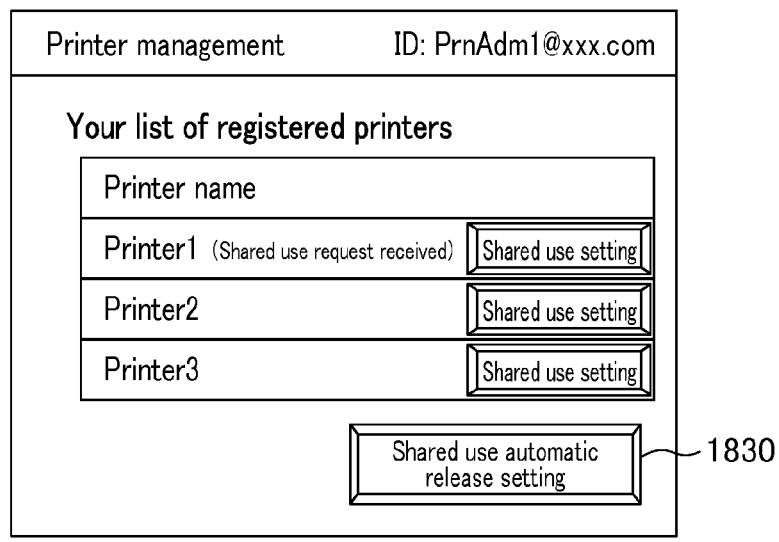

Next, (2) a means of automatic deletion after a fixed period from the final use or the use request will be described. A shared use automatic release setting button 1830 is set as a set item as illustrated in FIG. 18B in the printer management screen 1800 displayed by the printer shared use management unit 1022. When the manager depresses the button, the printer shared use management unit 1022 displays the shared use automatic release setting screen 800 as illustrated in FIG. 8A. The shared use automatic release setting screen 800 includes a time input element 810 and a setting button 820.

The printer manager depresses the setting button 820 after input of the time into 810. Upon depression, the printer shared use management unit 1022 records the time of input into the shared use automatic release time 3302 that matches the user ID 3301 of the printer manager on the shared use automatic release table 3330 illustrated in FIG. 35. Furthermore, when the printer manager authorizes shared use on the printer shared use management screen 1900, the printer shared use management unit 1022 records the time on the share use commencement time 1607 in FIG. 16E. The printer shared use management unit 1022 performs a periodical check of the shared use automatic release time table 3300. The printer shared use management unit 1022 acquires the shared use setting of the general user, that is linked to the SPID of the image forming device 110 managed by the printer manager set with reference to the shared use automatic release time 3302, from the printer shared use information table 1600. The printer shared use management unit 1022 releases the shared use setting when the time calculated by addition of the shared use automatic release time 3302 to the shared use commencement time 1607 is an historical time rather than the current time, that is to say, when a preset time has elapsed.

Similar aspects related to these functions are described below. A first similar aspect may be configured with reference to the above example by enabling setting of one shared use automatic release time in all image forming devices managed by the printer manager. However, a setting of a shared use automatic release time respectively to the image forming devices is also possible. A time input element 1991 is provided as illustrated in FIG. 21A in the printer shared use management screen 1900 displayed by the printer shared use management unit 1022. Then, when the printer manager depresses the OK button by input of the time, the time is recorded in the shared use automatic release time 1205 illustrated in FIG. 12B.

A second similar aspect may be configured with reference to the above example by setting a single shared use automatic release time for all image forming devices managed by the printer manager. However, a setting of a shared use automatic release time for each user sharing use of the image forming device 110 is also possible. A time input element 1992 is provided for each user as illustrated in FIG. 21B in the printer shared use management screen 1900 displayed by the printer shared use management unit 1022. Then, when the printer manager depresses the OK button by input of the time, the time is recorded in the shared use automatic release time 1608 illustrated in FIG. 16F.

A third similar aspect may be configured with reference to the above example by performing shared use automatic release with reference to the time after shared use approval by the printer manager. However, shared use release may be configured with reference to the time after the final use of the shared use image forming device by the general user. In this configuration, the printer shared use management unit 1022 is cooperated with the print notification sending unit 1011 and records the time of final use by a general user in the final use time 1609 illustrated in FIG. 16G of the printer shared use information table 1600 on the printer information storage unit 1002. In substitution for the shared use commencement time 1607, the shared use automatic release time 1608 may be added to the final use time 1609 and when the shared use automatic release time 1608 is an historical time rather than the current time, automatic removal is performed.

According to the print system in the third embodiment, limited use of an image forming device is enabled in relation to a general user, and therefore security can be maintained in relation to shared use of the image forming device.

Fourth Embodiment

A print job format that can be output by the external print service 350 is not limited to a format that is interpreted by the image forming device 110. Furthermore, there may be a case an optimal (enhanced/rapid) print result is realized. Alternatively, there is the possibility that the external print service 350 do not have sufficient performance in relation to an output of an external large number of image forming devices. A solution method may be configured by disposing a print job conversion and redistribution service (not illustrated) that has the function of an intermediate processing device between the image forming device 110 and the external print service 350. Furthermore, the print job conversion and redistribution service may be disposed by a service provider for provision of the external print service 350, a corporation using the services or a third party. In particular, when the print job conversion and redistribution service disposed by a third party is employed, there is a need for operation with consistency of the three systems, that is, the internal company authentication, the authentication of the print job conversion and redistribution service and the authentication of the external print service 350.

Firstly the flow of registering the image forming device in the print job conversion and redistribution service and the external print service 350 prior to use of the print job conversion and redistribution service will be described with reference to FIG. 37. The internal company printer manager acquires the print job conversion and redistribution service account in advance. Then, the manager acquires an RPID of the image forming device 110 under their management and passes the RPID to the print job conversion and redistribution service. The RPID is passed after the external print service printer generating unit 460 passes authentication of the printer manager. Therefore, a general user cannot execute unauthorized acquisition of an RPID and pass it to the print job conversion and redistribution service. When the print job conversion and redistribution service receives the RPID, a virtual printer corresponding to the actual image forming device 110 is created on the service (step 2 in FIG. 37). The virtual printer is viewed by the external print service 350 as equivalent to the actual image forming device 110, and is viewed by the actual image forming device 110 as equivalent to a service printer of the external print service 350, and has the function of converting and distributing the print job. When the virtual printer is created, a virtual printer ID (VPID) is allocated, and the external print service printer generating unit 460 stores the VPID in accordance with the VPID 1126 illustrated in FIG. 11C in the external print service information storage unit 480. The RPID and the VPID are associated with each other and stored in the same manner on the virtual printer side. In this manner, the print job that is input into the virtual printer can be sent to the actual image forming device 110 after conversion by the virtual printer.

Figure 37:
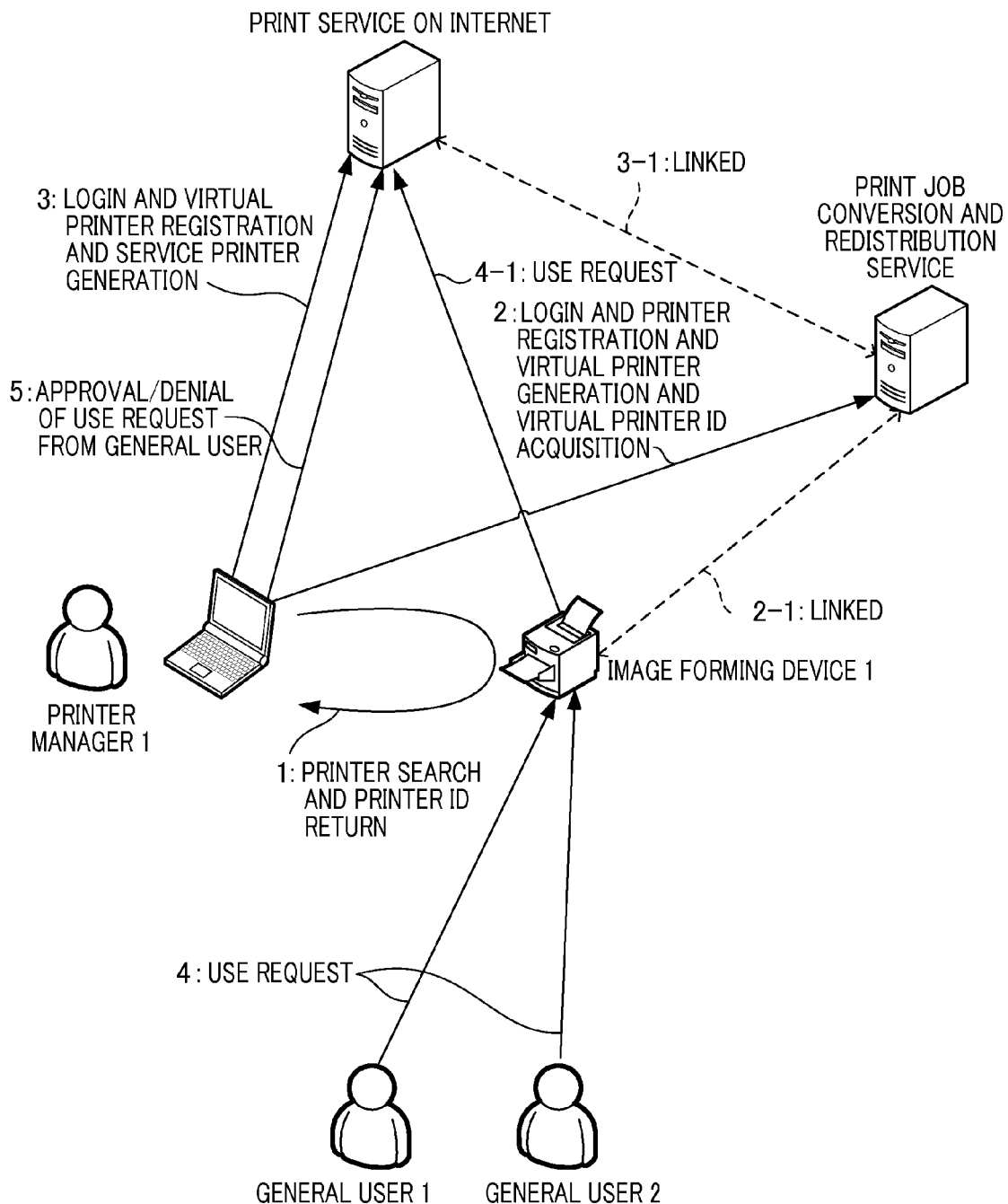
FIG. 37 illustrates a shared use setting when using a print job conversion and redistribution service.

Next, the printer manager registers the image forming device 110 on the external print service 350 (step 3 in FIG. 37). In contrast to the operation described above, this operation differs in relation to the point that when the VPID described with reference to the external print service information storage unit 480 is stored, the VPID is sent in substitution for the RPID to the printer registration unit 1001 of the external print service 350. The printer registration unit 1001 generates a service printer, allocates the SPID, and the SPID is associated with the VPID and is respectively saved in the external print service information storage unit 480, the printer information storage unit 1002 and the print job conversion and distribution service. In this manner, the service printer is linked with a virtual printer (step 3-1 in FIG. 37), and the print job input into the service printer is transferred to the linked virtual printer.

Next, after the general user passes internal company authentication, a use request is made to the printer shared use request unit 1021 of the external print service 350 through the image forming device 110 (steps 4, and 4-1 in FIG. 37). At this time, when the VPID is stored in the external print service information storage unit 480, although the VPID is sent to the printer shared use request unit 1021 in substitution for the RPID, since the program is executed internally, the general user is not aware of any particular change.

Next, the printer manager accesses the printer shared use management unit 1022, and approves or denies the use request of the user (step 5 in FIG. 37). However, there is no particular requirement for the printer manager to be aware of the print job conversion and redistribution service. After approval by the printer manager, the general user uses the Web application 360 to select a virtual printer connected to the external print service 350 and sends the print job. The print job passes through intermediate conversion, and is transferred in order through the service printer, virtual printer, and the actual image forming device 110 to thereby obtain a printed product in the processing of the print execution unit 440. At this time, the name of the virtual printer is based on the name of the actual image forming device 110, and therefore, there is no particular awareness of the existence of the virtual printer.

Figure 14D:
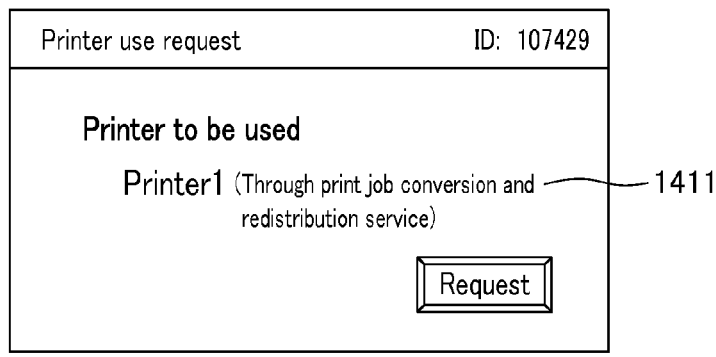
Figure 18C:
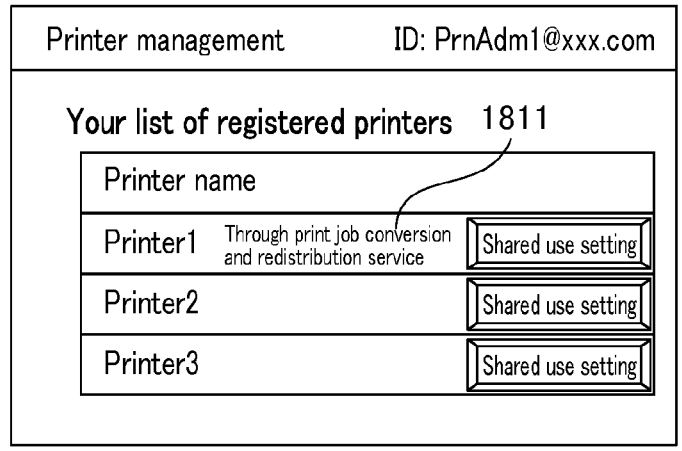

However, it may be the case that explicit designation of the virtual printer is preferred. In this context, a display 1411 may be provided to that effect through the print job conversion and redistribution service as illustrated in FIG. 14D on the printer use request screen seen by the general user. Furthermore, a display 1811 may be provided to that effect through the print job conversion and redistribution service as illustrated in FIG. 18C on the printer use request screen seen by the printer manager.

The print system in the fourth embodiment enables execution by the image forming device of a print job in a format which the image forming device that is the address for print output can interpret. In this manner, the printing performance of the overall system is enhanced.

Next a modified example of the fourth embodiment will be described. In the first to the third embodiments, the external print service 350 has the function (shared use receiving function) of receiving a shared use request from a general user (hereinafter simply referred to as a "user"), and the user performs a shared use request to the external print service 350. In the modified example of the fourth embodiment, the user makes a shared use request to the print job conversion and redistribution service. In this example, the print job conversion and redistribution service has the function as a reception means of receiving the shared use request. An example of the system operation process when the print job conversion and redistribution service has the function of shared use request reception will be described below.

Firstly, a user that is logged into the image forming device 110 depresses the external print service use request button 1310 on the general user menu 1300 illustrated in FIG. 13A that is displayed by the management unit 450. The depression operation causes a log in screen request to the print job conversion and redistribution service, and the image forming device 110 receives and displays the log-in screen from the print job conversion and redistribution service. When the user ID and the password for the conversion service are entered as authentication information by the user on the log-in screen, the image forming device 110 performs a log-in request including the input authentication information to the print job conversion and redistribution service. The conversion service user ID is the user ID for logging into the print job conversion and redistribution service.

Next, in response to the log-in request, the print job conversion and redistribution service acquires the printer name that is associated with the VPID corresponding to the image forming device 110 and displays the printer user request screen in the same manner as the printer use request screen illustrated in FIG. 14D on the image forming device 110. When the user make a shared use request on the printer user request screen, the print job conversion and redistribution service generates printer shared use information and stores it in the printer shared use information table 2000.

FIG. 39 illustrates an example of a printer shared use information table held by the print job conversion and redistribution services. The printer shared use information table 2000 includes data items such as a VPID, RPID, conversion service user ID, shared use user ID and status. The VPID is identification information enabling unique identification of a virtual printer corresponding to the image forming device 110. The RPID is identification information enabling unique identification of the image forming device.

In the present example, the print job conversion and redistribution services pre-stores the correspondence information for the shared use user ID and the conversion service user ID. The print job conversion and redistribution service uses the correspondence information to convert the conversion services user ID input when logging in to a shared use user ID for inclusion into the printer shared use information table.

When the printer shared use information is generated, the status is set as "request received". The print job conversion and redistribution service may be configured to manage the internal company printer access right, the internal company user ID and the like with reference to the printer shared use information table. In the present example, the printer information storage unit 1002 of the external print service 350 includes a printer information table 3000 as illustrated in FIG. 40 for example. The printer information table 3000 includes data items such as a VPID in substitution for the RPID in the printer information table illustrated in FIG. 12A.

When the printer manager logs into the printer shared use management unit 1022 of the external print service 350 using the user ID of the external print service, the printer shared use management unit 1022 refers to the printer information table 3000 illustrated in FIG. 40. The printer shared use management unit 1022 specifies a VPID corresponding to the user ID of the external print service, and request printer shared use information corresponding to the specified VPID to the print job conversion and redistribution service. The sending unit that functions as a sending means that included in the print job conversion and redistribution service that received the request transfers information included in the record corresponding to the VPID (one row data) in the printer shared use information table in FIG. 39 to the printer shared use management unit 1022. The printer shared use management unit 1022 displays a printer management screen as illustrated in FIG. 18C based on the information of the record transferred from the print job conversion and redistribution service.

When the printer manager depresses the shared use setting button on the printer management screen illustrated in FIG. 18C, the printer shared use management unit 1022 displays the printer shared use management screen as illustrated in FIG. 19A for example. Naturally, the external print service 350 may be configured to display the internal company printer access right, the internal company user ID as illustrated in FIG. 19C and FIG. 20A above on the printer management screen. When the selected use request of the user is approved by an operation of the printer manager on the printer shared use management screen, the external print service 350 sends the approval result to the print job conversion and redistribution service. The print job conversion and redistribution service receives the approval result and updates the status corresponding to the approved user in the printer shared use information table illustrated in FIG. 39 from "request received" to "printing possible".

Next, a function in which a user cause an internal company image forming device 110 to print from a Web application through the external print service 350 on will be described in relation to the modified example in the fourth embodiment. The user accesses to the Web application 360 from the Web browser 330 (FIG. 3) on the user terminal 130 and instructs printing. The Web application 360 sends the ID of the user (shared use user ID) to the Web application cooperation unit 1030 of the external print services 350, and request a printer list corresponding to the shared user ID.

The Web application cooperation unit 1030 sends the shared use user ID to the print job conversion and redistribution service, and checks the information for the virtual printer corresponding to the shared use user ID and the shared use conditions (status). The print job conversion and redistribution service that received the enquiry looks up the printer shared use information table 2000 illustrated in FIG. 39 so as to acquire the status corresponding to the shared use user ID received from The Web application cooperation unit 1030. When the acquired status is "printing possible", the print job conversion and redistribution service acquires the VPID corresponding to the shared use user ID in the printer shared use information table 2000. The print job conversion and redistribution service returns the information about the printer corresponding to the acquired VPID to The Web application cooperation unit 1030. The Web application cooperation unit 1030 returns the information about the printer received from the print job conversion and redistribution service to the Web application 360, and the Web application 360 displays the printer list based on the information about the printer.

When the user selects the printer for the address for print output from the displayed printer list, the Web application 360 sends the SPID corresponding to the selected printer to the Web application cooperation unit 1030. Then, the Web application 360 sends the document data selected by the user to the Web application cooperation unit 1030. The control unit 1004 of the external print service 350 receives the list from the Web application cooperation unit 1030, and looks up the printer information table 3000 illustrated in FIG. 40 to thereby specify the VPID corresponding to the SPID received from the Web application 360. The Web application cooperation unit 1030 receives an instruction from the control unit 1004 together with the specified VPID and executes a print job conversion request by sending the document data received from the Web application 360 to the print job conversion and redistribution service.

The print job conversion and redistribution service includes an acquisition unit configured to function as an acquisition means, and receives document data from the Web application cooperation unit 1030. The conversion unit provided in the print job conversion and redistribution service converts document data contained in the received print job conversion request to document data that can be interpreted by the image forming device corresponding to the VPID contained in the print job conversion request. In this manner, the conversion unit generates a print job. Then, the print job conversion and redistribution service looks up the printer shared use information table illustrated in FIG. 39 and specifies an RPID corresponding to the VPID contained in the print job conversion request. The print job conversion and redistribution service inputs the generated print job to the printer corresponding to the specified RPID.

The example in which a user performs a shared use request to a print job conversion and redistribution service is not limited to the modified example in the fourth embodiment above. For example, the external print service 350 may include a table that is the same as the printer shared use information table 2000 illustrated in FIG. 39. The shared use state of the user can be managed in cooperation with the print job conversion and redistribution service by synchronizing the table with the printer shared use information table 2000. Furthermore, the external print service 350 may be configured to receive a print job generated by the print job conversion and redistribution service and then input the received print job into the image forming device of the print output address.

According to the print system in the modified example of the fourth embodiment, the general user can request shared use of the image forming device by use of an account of the print job conversion and redistribution service. Furthermore, the system manager can approve or deny a request for shared use on the printer shared use management screen of which the information related to the request for shared use provided from the external print service 350 is reflected. In another modified example, the printer shared use information is provided in the external print server 150 in the same manner as the first embodiment, and the print job conversion and redistribution service acts as the substitute performer of the shared use request from the client. In this configuration, the print job conversion and redistribution service provides a screen for the shared use request, but other functions are included in the external print server 150 in the same manner as the first embodiment.

Aspects of the present invention can also be realized by a computer of a system or device (or devices such as a CPU or MPU) that reads out and executes a program recorded on a memory device to perform the functions of the above-described embodiments, and by a method, the steps of which are performed by a computer of a system or device by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-009393 filed Jan. 19, 2012, which is hereby incorporated by reference herein in its entirety.

What is claimed is:

1. A print system comprising:
a web service provision device that receives a print instruction from a user device and generates a print job; and
an image forming device that receives the print job through a network from the web service provision device and executes printing,
wherein the image forming device comprises a display unit configured to display a shared use request screen, which is operated by a user other than a manager of the image forming device, for requesting a registration of a shared use of the user for the image forming device, and
wherein the web service provision device comprises:
a receiving unit configured to receive the request for the registration of the shared use for the image forming device by the user through the shared use request screen;
a generating unit configured to generate a setting screen for setting by the manager whether or not to approve the request for the registration of the shared use for the image forming device; and
a registration unit configured to register printer information corresponding to the image forming device used by the manager as printer information for the manager in a storage unit,
wherein the generating unit further generates the setting screen including setting items for an automatic release setting for automatically releasing the request for the registration of the shared use when a predetermined time from the time of the request for the registration of the shared use has expired, and
wherein the registration unit determines whether the predetermined time from the time of the request for the registration of the shared use has expired when the automatic release setting is set, and automatically releases the request for the registration of the shared use when the predetermined time has expired.

2. The print system according to claim 1,
wherein the registration unit further associates shared use request information related to the request for the registration of the shared use for the image forming device received from the user other than the manager with the printer information corresponding to the image forming device and registers them in the storage unit, and
wherein the generating unit specifies the printer information corresponding to the image forming device from the printer information for the manager stored in the storage unit when the manager accesses the web service provision device and selects setting of whether or not to approve the request for the registration of the shared use for the image forming device, acquires the shared use request information corresponding to the specified printer information from the shared use request information stored in the storage unit, and generates the setting screen based on the acquired shared use request information.

3. The print system according to claim 1, wherein shared use request information contains access right information related to an access right of the user other than the manager to the image forming device, and wherein the generating unit generates an automatic approval/denial setting screen for setting automatic approval or denial with respect to the request for the registration of the shared use for the image forming device depending on presence or absence of the access right of the user to the image forming device, and automatically approves or denies the request for the registration of the shared use for the image forming device based on setting details on the automatic approval/denial setting screen and the access right information included in the shared use request information when the request for the registration of the shared use for the image forming device is received.

4. The print system according to claim 3, wherein the access right to the image forming device includes one or more of a printer access right, a scan right, a copy right, a FAX sending right, a FAX receiving right, or a data send/receive right.

5. The print system according to claim 1, wherein the generating unit notifies the user device operated by the manager that the request for the registration of the shared use has been made when the request for the registration of the shared use is received, when a number of non-approved requests of the registration of the shared use is greater than or equal to a predetermined threshold, or when the request for the registration of the shared use is detected by a monitoring process for the request for the registration of the shared use in a predetermined period.

6. An intermediate process device that receives a print job through a network from a web service provision device that generates the print job upon receipt of a print instruction from a user device, and sends the print job to an image forming device, the intermediate process device comprising:

a receiving unit configured to receive a request for a registration of a shared use of a user for the image forming device performed by the user on a shared use request screen which is operated by the user other than a manager for requesting of the shared use of the user for the image forming device, the shared use request screen displayed by the image forming device;

a sending unit configured to send information relating to the request for the registration of the shared use for the image forming device to the web service provision device so as to cause the web service provision device to generate a setting screen to set by the manager whether or not to approve the received request for the registration of the shared use for the image forming device when the manager accesses the web service provision device and selects setting of whether or not to approve the request of the registration of the shared use for the image forming device;

an acquisition unit configured to acquire the print job, generated in response to the print instruction through the user device operated by the user who has been approved of the request for the registration of the shared use for the image forming device, from the web service provision device; and a conversion unit configured to convert the acquired print job to a format that can be printed by the image forming device.

7. A method for controlling a print system comprising a web service provision device that receives a print instruction from a user device and generates a print job, and an image forming device that receives the print job through a network from the web service provision device and executes printing, the method comprising:

displaying, by the image forming device, a shared use request screen, which is operated by a user other than a manager, for requesting a registration of a shared use of the user for the image forming device;

receiving, by the web service provision device, the request for the registration of the shared use for the image forming device by the user through the shared use request screen;

generating, by the web service provision device, a setting screen for setting by the manager of whether or not to approve the received request for the registration of the shared use for the image forming device;

registering, by the web service provision device, printer information corresponding to the image forming device used by the manager as printer information for the manager in a storage unit;

setting items for an automatic release setting for automatically releasing the request for the registration of the shared use when a predetermined time from the time of the request for the registration of the shared use has expired;

determining whether the predetermined time from the time of the request for the registration of the shared use has expired when the automatic release setting is set; and automatically releasing the request for the registration of the shared use when the predetermined time has expired.

8. A non-transitory storage medium on which is stored a computer program for making a computer execute a method for controlling a print system that comprises a web service provision device that receives a print instruction from a user device and generates a print job, and an image forming device that receives the print job through a network from the web service provision device and executes printing, the method comprising:

displaying, by the image forming device, a shared use request screen, which is operated by a user other than a manager, for requesting a registration of a shared use of the user for the image forming device;

receiving, by the web service provision device, the request for the registration of the shared use for image forming device by the user through the shared use request screen;

generating, by the web service provision device, a setting screen for setting by the manager whether or not to approve the received request for the registration of the shared use for the image forming device;

registering, by the web service provision device, printer information corresponding to the image forming device used by the manager as printer information for the manager in a storage unit;

setting items for an automatic release setting for automatically releasing the request for the registration of the shared use when a predetermined time from the time of the request for the registration of the shared use has expired;

determining whether the predetermined time from the time of the request for the registration of the shared use has expired when the automatic release setting is set; and automatically releasing the request for the registration of the shared use when the predetermined time has expired.

9. A web service provision device that receives a print instruction from a user device, generates a print job, and sends the generated print job through a network to an image forming device, the web service provision device comprising:

a receiving unit configured to receive a request for a registration of a shared use of the user for the image forming device instructed through a shared use request screen, which is operated by a user other than a manager, for requesting the registration of the shared use for the image forming device;

a generating unit configured to generate a setting screen for setting by the manager of whether or not to approve the received request for the shared use for the image forming device;

a provision unit configured to provide a print job to the image forming device according to a print request from the user who has been approved by the manager through the generated setting screen; and a registration unit configured to register printer information corresponding to the image forming device used by the manager as printer information for the manager in a storage unit, wherein the generating unit further generates the setting screen including setting items for an automatic release setting for automatically releasing the request for the registration of the shared use when a predetermined time from the time of the request for the registration of the shared use has expired, and wherein the registration unit determines whether the predetermined time from the time of the request for the registration of the shared use has expired when the automatic release setting is set, and automatically releases the request for the registration of the shared use when the predetermined time has expired.

* * * * *